US011333262B2

(12) United States Patent
Begg

(10) Patent No.: US 11,333,262 B2
(45) Date of Patent: May 17, 2022

(54) VALVE AND ASSOCIATED METHODS

(71) Applicant: Product4 Limited, Newcastle Upon Tyne (GB)

(72) Inventor: Douglas Begg, Newcastle Upon Tyne (GB)

(73) Assignee: Product4 Limited, Newcastle Upon Tyne (GB)

( * ) Notice: Subject to any disclaimer, the term of this patent is extended or adjusted under 35 U.S.C. 154(b) by 235 days.

(21) Appl. No.: 16/489,755

(22) PCT Filed: Mar. 8, 2018

(86) PCT No.: PCT/GB2018/050588
§ 371 (c)(1),
(2) Date: Aug. 29, 2019

(87) PCT Pub. No.: WO2018/162907
PCT Pub. Date: Sep. 13, 2018

(65) Prior Publication Data
US 2019/0383412 A1    Dec. 19, 2019

(30) Foreign Application Priority Data

Mar. 8, 2017   (GB) ..................... 1703698

(51) Int. Cl.
*F16K 21/20*      (2006.01)
*A47G 19/22*      (2006.01)
(Continued)

(52) U.S. Cl.
CPC .......... *F16K 21/20* (2013.01); *A47G 19/2266* (2013.01); *A47G 19/2272* (2013.01);
(Continued)

(58) Field of Classification Search
CPC ............ A47G 19/2272; A47G 19/2266; A47G 21/18; A61J 11/002; A61J 11/0095;
(Continued)

(56) References Cited

U.S. PATENT DOCUMENTS 3,221,945 A * 12/1965 Davis, Jr. ............... A61M 11/00
                                                  222/633
3,739,938 A *  6/1973 Paz .................... A47G 19/2272
                                                  220/715
(Continued)

FOREIGN PATENT DOCUMENTS

CN    2018800298290    4/2020
WO PCT/GB2018/050588   9/2018

OTHER PUBLICATIONS

European Patent Office, Communication pursuant to Article 94(3) EPC in EP 18711642.1, dated Sep. 17, 2021.

*Primary Examiner* — Chun Hoi Cheung
*Assistant Examiner* — Brijesh V. Patel
(74) *Attorney, Agent, or Firm* — Dorton & Willis LLP; Ryan Willis

(57) ABSTRACT

A container (5) comprising a valve (10) with a valve member (12) and a valve seat (14). The container (5) has a retainer for retaining the valve member (12). The valve (10) defines a flowpath between the valve member (12) and the valve seat (14), the flowpath being selectively openable by movement of at least a portion of the valve member (12) away from the valve seat (14) in response to suction. The flowpath does not pass through any aperture within the valve member (12).

18 Claims, 18 Drawing Sheets

(51) Int. Cl.
*F16K 15/14* (2006.01)
*B65D 47/20* (2006.01)

(52) U.S. Cl.
CPC ........ *B65D 47/2062* (2013.01); *F16K 15/144* (2013.01); *F16K 15/147* (2013.01)

(58) Field of Classification Search
CPC ..... A61J 11/04; A61J 9/00; A61J 9/005; A61J 9/008; A61J 9/0661; A61J 15/0011; A61J 15/0092; B65D 47/2018; B65D 47/2068; B65D 47/243; B65D 47/32; B65D 47/06; B65D 47/066; B65D 47/2062; B65D 47/2075; B65D 47/2081; B65D 47/248; B65D 2205/00; B65D 2231/005; B65D 23/02; B65D 51/1644; B65D 83/0055; F16K 15/144; F16K 15/147; F16K 15/14; F16K 11/105; F16K 2099/0088; F16K 21/20; F16K 7/07; F16K 99/0015; F16K 99/0057
USPC ...... 220/714, 717, 203.11, 203.23, 703, 705, 220/708; 215/11.1, 11.4–11.6, 311, 215/387–388; 137/859, 112–113, 455, 137/468, 508, 510, 512.4, 513.5, 516.27, 137/521, 527, 533.31, 614.21, 630.22, 137/843, 847, 852–853, 855–856; 222/494, 105, 212, 215, 481, 490–491, 222/496, 556
See application file for complete search history.

(56) References Cited

U.S. PATENT DOCUMENTS

| | | | | |
|---|---|---|---|---|
| 4,121,731 A * | 10/1978 | Okerstrum | | A47G 19/2272 220/715 |
| 4,135,513 A * | 1/1979 | Arisland | | A61J 11/002 215/11.4 |
| 4,141,379 A * | 2/1979 | Manske | | F16K 15/144 137/496 |
| 4,222,407 A * | 9/1980 | Ruschke | | F16K 15/141 137/512.15 |
| 4,550,749 A * | 11/1985 | Krikorian | | F16K 15/148 137/843 |
| 4,556,086 A * | 12/1985 | Raines | | F16K 15/141 137/852 |
| 4,646,945 A * | 3/1987 | Steiner | | A47K 5/1209 222/207 |
| 4,749,003 A * | 6/1988 | Leason | | F16K 15/148 137/854 |
| 4,898,581 A * | 2/1990 | Iwatschenko | | A61M 5/36 137/854 |
| 4,946,448 A * | 8/1990 | Richmond | | A61M 39/24 137/493.9 |
| 4,958,661 A * | 9/1990 | Holtermann | | F16K 15/141 137/843 |
| 4,966,199 A * | 10/1990 | Ruschke | | F16K 15/141 137/843 |
| 5,218,993 A * | 6/1993 | Steinberg | | F16K 15/141 137/515.5 |
| 5,472,122 A * | 12/1995 | Appleby | | B65D 47/2031 222/212 |
| 5,607,073 A * | 3/1997 | Forrer | | A47G 19/2272 215/11.4 |
| 5,613,517 A * | 3/1997 | Handler | | B05B 11/007 137/512.4 |
| 5,890,620 A | 4/1999 | Belcastro | | |
| 5,983,927 A * | 11/1999 | Simon | | B05B 11/3067 137/516.27 |
| 5,992,462 A * | 11/1999 | Atkinson | | A61M 39/24 137/515.5 |
| 6,062,436 A * | 5/2000 | Fuchs | | B65D 47/2031 137/846 |
| 6,102,245 A * | 8/2000 | Haberman | | A47G 19/2272 215/387 |
| 6,508,379 B1 * | 1/2003 | Van De Pol-Klein Nagelvoort | | A47G 19/2272 215/11.4 |
| 7,070,065 B2 * | 7/2006 | Wong | | A47G 19/2266 220/714 |
| 7,204,380 B2 * | 4/2007 | Webb | | A47G 19/2272 215/11.4 |
| 7,419,069 B2 * | 9/2008 | Naesje | | B65D 47/2081 220/714 |
| 7,537,133 B2 * | 5/2009 | Naesje | | A61J 9/008 220/714 |
| 7,753,226 B2 * | 7/2010 | Chauvin | | A61J 7/0046 220/714 |
| 7,775,394 B2 * | 8/2010 | Naesje | | B65D 47/248 220/714 |
| 8,074,685 B2 * | 12/2011 | Calvo | | F16K 15/144 137/855 |
| 8,336,745 B2 * | 12/2012 | Brannon | | B65D 47/06 222/547 |
| 8,579,606 B2 * | 11/2013 | Chen | | F04B 43/043 417/413.2 |
| 8,752,579 B2 * | 6/2014 | Bushman | | A61C 1/16 137/527 |
| 9,386,869 B2 * | 7/2016 | Kamping | | A47G 19/2272 |
| 9,889,966 B2 * | 2/2018 | Medeiros | | B65D 47/2018 |
| 2003/0209555 A1 * | 11/2003 | Belcastro | | A47G 19/2272 220/714 |
| 2004/0060598 A1 * | 4/2004 | Danby | | G05D 7/0106 137/508 |
| 2004/0222229 A1 * | 11/2004 | Gabbard | | A47G 19/2272 220/705 |
| 2005/0145636 A1 | 7/2005 | Albright et al. | | |
| 2006/0108373 A1 | 5/2006 | Cheng | | |
| 2010/0044386 A1 * | 2/2010 | Samson | | B65D 47/2062 220/719 |
| 2013/0119008 A1 * | 5/2013 | Pfenniger | | A61J 11/0015 215/11.5 |
| 2013/0240050 A1 * | 9/2013 | Bonomi | | F16K 15/142 137/15.18 |
| 2014/0183154 A1 * | 7/2014 | Essebaggers | | B65D 47/2075 215/311 |
| 2015/0208838 A1 * | 7/2015 | Parker | | A47G 19/2272 220/714 |
| 2018/0008068 A1 * | 1/2018 | Kamping | | B65D 51/1644 |

* cited by examiner

VALVE AND ASSOCIATED METHODS

TECHNICAL FIELD

This disclosure concerns a valve. For example, the disclosure concerns a valve for a fluid container, such as a drinking vessel. In particular, but not exclusively, examples of the disclosure concern a leak-resistant valve for sippy cups, baby bottles, toddler cups, sports bottles or the like.

BACKGROUND

Containers are widely used for drinking liquids, with travel mugs and spill-resistant cups often coming with lids to prevent spillage. In addition, sports bottles are commonly provided with a screw-on lid having a straw, and sometimes with a cap for sealing the end of the straw. Some sports bottles also have a manually operated pop-up vent which is sealed when pushed down and open when pushed up.

One type of cup particularly well suited for small children includes a cup body and a lid which fits sealingly on to the cup body, with a drinking spout incorporated into the lid. Some such cups are so-called no-spill drinking cups, suitable for infant usage. The aim of a no-spill cup and associated valve is to provide a cup which allows the contents of the cup to escape through the valve only upon usage by the user, for example via the application of suction. Suction-operated valves are sometimes referred to as 'demand valves' to differentiate them from other non-spill valves, such as 'bite valves', which are opened by the user temporarily deforming the closure device with their teeth or lips to allow liquid to escape.

SUMMARY

According to a first aspect there is provided a valve, such as for selectively sealing a container. The container may comprise a drinking vessel, such as a sippy cup, baby bottle, toddler cup, sports bottle or the like.

The valve may comprise a valve member. The valve may comprise a valve seat. The valve may define a flowpath. The flowpath may be defined between the valve member and the valve seat. In particular, the flowpath may be defined in a volume or passage bounded by the valve member on one side and the valve seat on an opposite side (e.g. the flowpath being therebetween). The valve seat may define a location of a seal. The flowpath may be selectively openable in response to suction generated by a user. The flowpath may be selectively openable and closable by movement of at least a portion of the valve member relative to the valve seat. The movement of the at least a portion of the valve member may comprise deformation and/or deflection of the at least a portion of the valve member. The movement of the at least a portion of the valve member may be in a direction away from the valve seat to open the flowpath. The movement may be away from the suction source. The movement of the at least a portion of the valve member to open the flowpath may be linked to a movement of at least another portion of the valve member in a direction generally towards an outlet from the container, such as the suction source generated by the user. In at least some examples, the movement of the at least another portion of the valve member to open the flowpath may be in a direction generally transverse to the flowpath, such as perpendicular. The movement of the at least another portion of the valve member towards the outlet may pull the at least a portion of the valve member away from the seat so as to break the seal. Additionally, or alternatively, the movement of the at least another portion of the valve member towards the outlet may lever the at least a portion of the valve member away from the seat so as to break the seal, such as using a stiffness of the valve member to lever the at least a portion of the valve member away from the valve seat. The valve member may be sufficiently stiff to cause the portion of the valve member to be levered away from the valve seat by pivoting, such as when the valve is subject to underpressure (e.g. sucking by a user). For example, the at least another portion of the valve member exposed to underpressure from the outlet when the valve is sealed may lever the portion of the valve member associated with or seated on the seat. The at least another portion of the valve member may comprise the portion exposed to outlet pressure when the valve is in the sealed configuration.

The valve member may be located or locatable at an interior of the container, such as on an interior of a spout, lid or wall of the container.

Opening of the valve may require overcoming friction. The valve may be configured to maintain at least a portion of the seal using friction. The friction may comprise static friction and/or kinetic or dynamic friction. The friction may comprise dry friction and/or lubricated friction. For example, in at least some embodiments, the valve may comprise a liquid layer between at least a portion of the valve member and the valve seat. The liquid may comprise a portion of the liquid contents of the container. For example, where the container is a drinks container, the liquid may comprise a layer of the drinkable liquid. The valve may be configured, in a closed configuration, to maintain the valve member against the valve seat at least partially by friction between the valve member and the valve seat. A force to press the valve member against the valve seat to close may act in a parallel direction to a suction force towards the outlet. The force to press the valve member against the valve seat to close may act in a same direction to a suction force towards the outlet. The seal between the valve member and the valve seat may be configured to be broken by the suction force (e.g. towards the outlet) pulling the another portion of the valve member towards the suction source to lever the portion of the valve member away from the valve seat. The container may comprise a longitudinal axis. The longitudinal axis may be substantially vertical when the container is resting or positioned on a horizontal surface (e.g. with a base of the container horizontal). The longitudinal axis may comprise a central longitudinal axis. Parts or components of the container may be positionable on or along the longitudinal axis. The valve member may be positioned between the container base and the lid, or at least the outlet or spout portion of the lid. The valve member may be positioned between the retainer and the lid. The valve seat may be positioned between the valve member and the outlet. The valve seat may be positioned between the valve member and the outlet in the direction of the longitudinal axis. For example, where the container is positioned with the outlet above the valve member, the valve seat may also be located above the valve member. When sealing, the valve seat engages a same side of the valve member as is exposed to the outlet, such as suction therefrom. The valve seat engages the same major face of the valve member as is exposed to the outlet.

The valve member may form the seal at least partially using stiction. The valve may provide a resistance to opening the seal when the valve is closed, the resistance to opening being at least partially associated with a stiction between the valve member and the valve seat. Opening the valve so as to provide the flowpath for fluid to the outlet may comprise overcoming stiction between a stiction portion of the valve member. The stiction may be between the stiction portion of the valve member and another part of the valve, such as stiction between the valve member and the valve seat. In at least some examples, the stiction to be overcome to open the valve may be between the stiction portion of the valve member and a further stiction portion of the valve member.

The valve may be at least partially maintained in the closed configuration by an attraction between the valve member and the valve seat. The valve may be biased towards the closed configuration by the attraction between the valve member and the valve seat. The valve member and valve seat may be at least partially maintained in the closed configuration by a liquid film, thin liquid film, or ultra-thin liquid film. The valve member and valve seat may be at least partially maintained in the closed configuration by a meniscus effect, or a micro-meniscus effect. The valve member and valve seat may be at least partially maintained in the closed configuration by a capillary bridge. The valve member and valve seat may be at least partially maintained in the closed configuration by a charged attraction. For example, one of the valve member and valve seat may comprise a negative charge (e.g. a silicone rubber valve member) and the other may comprise a positive charge (e.g. a glass valve seat). The material/s of the valve seat and/or valve member may be selected to provide an attractive force therebetween. For example, the material/s of the valve seat and/or valve member may be selected to provide a triboelectric effect. The valve may be at least partially maintained in the closed configuration by a stiffness of the valve member. The valve may be at least partially reconfigured from the open to the closed configuration by a stiffness of the valve member. The valve may be biased towards the closed configuration by the stiffness of the valve member.

The valve may comprise a retainer for retaining the valve member relative to the valve seat. The retainer may be located or locatable at an interior of the container, such as on an interior of a spout, lid or wall of the container. The retainer may assist in defining a compartment or chamber for housing the valve member. The retainer may allow the valve member to move within the compartment or chamber. The retainer may be configured to allow at least a portion of the valve member to move along at least a portion of the retainer and/or the valve seat. The retainer may be configured not to press the valve member, or at least not all of the valve member, against the valve seat. In at least some examples, at least a portion of the retainer may be spaced from the valve seat so as to define a greater dimension of the chamber or compartment than a corresponding dimension of the valve member. For example, the retainer may be arranged relative to the valve seat to define a height or thickness of the compartment or chamber greater than a corresponding height or thickness of the valve member. The valve may comprise a gap between the valve member and the retainer in at least some configurations. The valve may comprise a gap between the valve seat and the retainer. The valve may comprise the gap and the valve member between the valve seat and the retainer. The valve member may be sandwiched between the valve seat and the retainer. The sandwich may also include a gap between the valve seat and the retainer. In at least some examples, the gap may be located between the valve member and the retainer, optionally in all configurations. In at least some examples, the gap may be located between the valve member and the valve seat in at least some configurations, such as the open configuration. In at least some examples, the gap may be present in all configurations. In at least some examples the gap may be present in both the open and the closed configurations. In at least some examples the gap may remain constant in both the closed and the open configurations. In at least some examples, the gap may be variable between the closed and the open configurations. For example, the gap may increase from the closed to the open configuration. The gap may be smaller than at least a portion of a cross-section of the flowpath when open.

The retainer may maintain at least a portion of the valve member relative to the valve seat in at least the closed configuration. The retainer may be configured to prevent unintended separation of the valve member from the valve, such as relocation of the valve member away from the vicinity of the valve, such as to another part of the container.

The retainer may loosely retain the valve member in the vicinity of the valve seat. The retainer may be configured to prevent dislocation or displacement of the valve member from the vicinity of the valve seat.

The container may comprise a closure, such as a lid, cap, top, cover or the like. The valve may be associated with the closure. For example, the valve may be mounted in or to the closure. The closure may define the valve seat. The openable flowpath may be defined between the valve member and the closure. The closure may comprise a fluid passage. The closure may comprise a spout, nozzle, mouth, straw or the like.

The retainer may be selectively movable relative to the valve seat. For example, the retainer may be selectively movable to open the chamber or compartment housing the valve member. The retainer may be selectively openable to allow access to the valve member, such as for one or more of: assembly; disassembly; maintenance; cleaning; repair; replacement; and inspection. The retainer may be at least partially detachable to allow access to the chamber or compartment and/or the valve member. The retainer may be only partially detachable to allow access to the compartment or chamber and/or the valve member. The retainer may be partially detachable to allow access to or for the valve member without completely detaching or separating the retainer. Allowing access to or for the valve member without completely detaching the retainer may allow inspection, cleaning, replacement, etc. of the valve member and/or the valve seat, whilst reducing a likelihood of misplacement or loss of the retainer whilst the valve member and/or the valve seat is inspected, cleaned, replaced, etc. The retainer may be selectively movable between at least two configurations: a first configuration being a retaining configuration whereby the valve member is retained relative to the valves seat; and a second configuration being an access configuration whereby the valve seat and/or valve member is/are accessible, such as for inspection or cleaning. The retainer may be selectively movable between the first and second configurations, such as by a user operation. In at least some examples, the retainer is partially detachable from the container, such as partially detachable from the valve seat, from the first configuration to the second configuration. Partial detachment may comprise unclipping a portion of the retainer. In at least some examples, the retainer may be pivoted open from the first configuration to the second configuration, the retainer only being partially detached, with the retainer remaining attached via a pivot or hinge. Upon completion of operation/s with the retainer in the second configuration, the retainer may be fully re-attached, such as by closing the retainer and securing the retainer in place, such as by clipping or snap-fitting into place. In at least some examples, the retainer is fully detachable, such as to a detached configuration. Accordingly, the retainer may be selectively fully detached, such as for cleaning, maintenance or repair. The retainer may be re-attachable. In at least some examples, the retainer is pivotally-mounted, being selectively reconfigurable between the first and second configurations by unclipping a portion of the retainer and pivoting the retainer about the hinge or pivot. The retainer may be further fully detachable by removal from the pivot or hinge, such as by also unclipping the retainer from the hinge or pivot. The retainer may be re-attachable by clipping in the pivot or hinge and pivoting the retainer to the retaining configuration. The retainer may be held in the retaining configuration by a clip, such as an integrated clip. The retainer may be configured to inhibit child access to the valve member. For example, the retainer may be secured in the retaining configuration so as to require adult manipulation, such as with adult dexterity and/or force, to reconfigure to the access configuration. In some examples, the retainer may be re-attachable using one or more of: an interference fit, such as a simple push-on; and/or a threaded connection, such as the retainer and lid have corresponding threaded portions so as to allow the retainer to rotate on to the lid like a cap on a bottle. The threaded portion may comprise a wall with screwthread at least partially around the valve. In such examples, the retainer and/or wall (e.g. an opening in either or both) may provide a flowpath, from the container through to the valve. In at least some examples, the retainer may be at least partially permanently fixed to the valve seat and/or lid, such as in a disposable container. The retainer may be statically fixed to the valve seat (e.g. not reconfigurable between use and access configurations). The retainer may be attached to the valve seat/container/lid by one or more of: ultrasonic welding (e.g. around the valve during manufacture); moulded-in, such as into the lid, with the valve being deformed/fed into a gap between the retainer and the valve seat; and/or adhesion, such as with a food-grade, non-dissolving adhesive.

The container may be configurable to a free-flow configuration, such as a configuration whereby suction is not required to open the valve and/or extract liquid from the container. The free-flow configuration may comprise a spout. The container may be reconfigurable between the free-flow configuration and a suction-actuated valved configuration, such as with the valve operating as described above. The container may be repeatedly, such as indefinitely, reconfigurable between the free-flow configuration and the suction-actuated valved configuration. In at least some examples, the valve may comprise a fixed open configuration. The fixed open configuration may allow the valve to be used as a two way valve. The fixed open configuration may allow the valve to be effectively made redundant. The fixed open configuration may allow fluid to pass through the valve without requiring any suction or any pressure differential to open the valve. The fixed open valve may allow the container to be reconfigured to a free-flow container. The valve may be reconfigured to the fixed open configuration by mechanically opening the valve. In at least some examples, the valve is reconfigured to the fixed open configuration by pushing the valve into the valve recess. For example, the retainer may comprise a protrusion on the reverse side from its side that normally engages or retains the valve member when in the closed configuration (e.g. a protrusion normally directed away from the valve recess in the closed configuration). The retainer may be reversible (e.g. by unclipping, inverting and then re-clipping) to provide the protrusion directed towards the valve recess to engage the valve member in the fixed open configuration to keep the valve member pushed into the valve recess, even in the absence of suction, such that the valve member cannot seal against the valve seat in the fixed open configuration. In other examples the valve may be reconfigured to a fixed open configuration by the removal of the valve member and optionally removal of the retainer. The valve may be reconfigurable from the fixed open configuration back to (e.g. by re-inversion of the retainer or re-insertion of the valve member). The means for reconfiguring the valve to the fixed open configuration may be configured to prevent or inhibit reconfiguration by a child. The means for reconfiguring the valve to the fixed open configuration may be suitable for operation by adults only. The means for reconfiguring the valve to the fixed open configuration may be located on an interior of the container. The container may be configured to prevent or inhibit child access to the interior of the container (e.g. opening of the container).

In at least some examples, the valve member and/or the retainer may be removable and/or repositionable within the container to reconfigure the container to the free-flow container. For example, the valve member and/or the retainer may be rotatable relative to the lid to misalign the valve member and/or the retainer with the outlet. The valve member and/or retainer and/or lid may be rotationally asymmetrical and/or offset about the central longitudinal axis of the container and/or lid. The valve member and/or retainer and/or the lid, or at least engagement surface/s hereof, may be flat and aligned in a plane/s perpendicular to the rotational axis. In at least some examples, the lid is movable relative to the retainer and/or the valve member to selectively align or misalign the outlet with the valve member for suction-actuated or free-flow use respectively. In at least some examples, the lid, such as the lid comprising the spout, may be rotatable relative to the retainer and/or the valve member and/or the body of the container. The lid may be rotatable between at least two positions: a first position whereby the spout and/or outlet of the lid is misaligned with the valve member and/or the retainer, being a free-flow position; and a second position whereby the spout and/or outlet of the lid is misaligned with the valve member and/or the retainer, being a 'demand' position (e.g. for valved operation whereby suction is required to open for flow through the outlet and/or spout). The first and second positions may be diametrically opposed. For example, the lid may be relatively rotatable through 180 degrees, optionally 360 degrees, between the two diametrically-opposed positions. In at least some examples, the lid may be relatively rotatable without removing the lid, such as from outside the container. The container may be reconfigurable between the free-flow and demand configurations without opening the container and/or without exposing, touching or releasing the valve and/or the retainer. In other examples, the container may be reconfigurable by opening and/or at least temporarily removing the lid, such as by relatively rotating the retainer and/or valve member within the container, relative to the lid. The container may be configured for reconfiguration by an adult, such as only reconfigurable by an adult. The container may be configured to at least impede reconfiguration by a child or infant.

The container may be reconfigurable to a training cup. The training cup may comprise a spout-free training cup. In at least some examples, the container may be configurable to a fully open cup, such as with a full-bore outlet providing unimpeded, unbroken flow from the container (e.g. with an outlet cross-section corresponding to a cross-section of the container therebelow—when in an upright position). The container may be reconfigurable between the training cup configuration and the fully open cup by the selective removal or placement of a component, such as the removal of the retainer to reconfigure the fully open cup. The training cup may comprise a component configured to assist in teaching of drinking from or proximal to a rim of the container, such as to teach of conventional drinking from an open cup. The component may comprise an enclosed outlet opening, restricting outflow to a vicinity of the container rim and/or towards a particular lateral position of the rim (e.g. to limit and/or encourage drinking from a particular portion or segment of the rim). The component may comprise the retainer. Accordingly, the retainer may comprise a training cup lid. The retainer may comprise an opening configured for use as the training cup outlet. The retainer's training cup outlet may comprise a valve-free opening suitable for use as an intermediate outlet to the spout, such as for use in the free-flow configuration. In at least some examples, the component, such as the retainer, may be sealed or sealable with the body of the container to provide a sealed training cup, such as around or along at least a portion of a perimeter of the component. In other examples, the component, such as the retainer, may provide a non-sealing fit or engagement, such as around or along at least a portion of the perimeter of the component.

The retainer may be attached or held by the body of the container. The container in the training cup configuration may consist of the body and the retainer. The retainer may be attachable to the container body with an interference fit. In at least some examples, the retainer may be attachable to the container body with a fastener, snap-fit, screwthread, bayonet fitting, or the like. The retainer may be non-rotatably attachable to the container body.

The valve member may comprise a membrane. The valve member may comprise a sheet. The sheet may comprise a flat sheet. The sheet may comprise a flat sheet at least in a rest configuration. In at least some examples, the sheet may comprise a flat sheet when in the closed configuration. In other examples, the sheet may be non-flat when in the closed configuration, such as rolled, flexed or curved. The sheet may be deformable from flat so as to provide a biasing force. For example, the sheet may be deformable from flat to non-flat during reconfiguration from the closed configuration to the open configuration so as to provide a biasing force towards a rest, flat sheet configuration, corresponding to a rest, valve closed configuration. The valve member may comprise a single sheet. The valve member may comprise a diaphragm. The diaphragm may comprise a single-walled diaphragm. The valve member may comprise a uniform thickness or substantially uniform thickness. In at least some examples, the valve member may comprise a plurality of sheets, such as two sheets each of uniform thickness. The valve member may comprise a uniform thickness or substantially uniform thickness in two directions or axis, the two directions or axis being perpendicular with respect to each other. The valve member may be free from one or more of: indentations; apertures; slits; and protrusions. The valve member may comprise at least one major face. The major face may comprise a continuous major surface. The continuous major surface may be configured to matingly engage the valve seat. The continuous major surface may be configured to matingly engage the valve seat around a full circumference of the valve seat, the full circumference of the valve seat. The major face may comprise a continuous surface portion at least over an area corresponding to an openable area of the major surface that engages with the valve seat when closed. The surface may be continuous within an area prescribed or bounded by the seal. The surface may be unbroken within the area prescribed or bounded by the seal. The surface may be aperture-free. The surface may be unbroken and aperture-free in all configurations and/or position, such as open and closed valve configurations. The continuous major surface may be uninterrupted. The major face may be free from one or more of: indentations, apertures, slits, and/or protrusions or the like. The valve member may comprise a pair of continuous major faces, the pair of continuous major faces defining opposite external surfaces facing outwards in opposite directions, such as upwards and downwards or front and back. A first major face may be for engaging the valve seat and a second major face may define an opposite external valve member surface, such as for engaging the retainer. The second major face may comprise a continuous major surface.

The valve member may comprise isotropic properties in two or more directions of the major face (e.g. length and breadth; or all directions), such as isotropic flexibility. The second major face may be free from one or more of: indentations, apertures, slits, and/or protrusions or the like. Alternatively, in at least some examples, the second major face may comprise one or more of: indentations, apertures, slits, and/or protrusions or the like. For example, the second major face may comprise one or more protrusion/s and or recesses, such as ribs that may assist in defining a deformation of the valve member (e.g. asymmetrically or in a particular plane, direct or directional). In at least some examples, the valve member may comprise anisotropic properties in two or more directions of the major face (e.g. length and breadth; or all directions), such as anisotropic flexibility. The valve member may comprise only two major surfaces. The two major surfaces may be separated by the thickness of the sheet. The thickness of the sheet may define one or more edge/s around a periphery or outline of the major face/s. The major face/s may be considerably greater in magnitude in at least one direction than the magnitude (e.g. thickness) of the edge/s of the valve member. The major face/s may be considerably greater in magnitude in two directions (e.g. length & breadth, or X and Y) than the magnitude (e.g. thickness) of the edge/s of the valve member. The valve member may be free from apertures, such as slits, holes, perforations or other openings. The valve member may be free from apertures, such as slits, holes, perforations or other openings, in both the closed and the open configurations.

The valve member may be reversible. For example, the valve member may comprise two major continuous surfaces, on opposite sides of the valve member (e.g. one facing upwards, the other facing downwards). The valve member may be reversible such that either side or either major face may be matingly sealable with the valve seat. Additionally or alternatively, the valve member may be rotationally symmetrical, such as about an axis perpendicular to the major face. The valve member may be rotationally symmetrical such that the valve member can be assembled or mounted within the container in a plurality of correct, identical positions. For example, the valve member may comprise at least two (e.g. rectangular) or at least four (e.g. square) positions about its rotational axis in which it can be correctly assembled. In at least some examples, the valve member may be mountable in a plurality of positions so as to ease assemble and/or disassembly and/or reassembly. For example, the valve member may comprise a rectangular flat sheet that is reversible, such that the valve member can be assembled in at least four orientations (e.g. at least two rotational positions for each of two reversible orientations). In the closed configuration, the valve member may comprise uniform cross-sections along two entire axes, each axis extending in a respective discrete direction, such as x and y or width and length. In at least some examples, in the closed configuration, the valve member may comprise uniform cross-sections along three entire axes, each axis extending in a respective distinct direction, such as x and y and z or width and length and height. Each axis may be perpendicular to at least one other axis. Reconfiguring the valve member to the open configuration may comprise altering the valve member cross-section along at least a portion of the axis in one or more directions.

In the closed configuration, the valve member may comprise a uniform profile in at least two directions, such as x and y or width and length. In at least some examples, in the closed configuration, the valve member may comprise a uniform profile along an entire axis in at least three directions, such as x and y and z or width and length and height. Reconfiguring the valve member to the open configuration may comprise altering the valve member profile at at least a portion of the axis in one or more directions.

When activated, the valve may provide a flowpath that does not pass through or otherwise require an aperture in the valve member. The valve may not require an aperture defined solely by or within the valve member. In contrast to other valves whereby an aperture, such as a slit, in a valve member is selectively openable, the valve of the present disclosure may be activated by selectively opening a flowpath between the valve member and the valve seat. The valve may be selectively openable by selectively separating at least a portion of the valve member from the valve seat. The portion of the valve member may be separable from the valve seat by deformation of the valve member under suction.

The valve may be configured to provide the openable flowpath along or at a periphery or peripheral portion of the valve member, such as an edge or edge face of the valve member. The valve may be configured to provide a closable sealing portion along or at the periphery or peripheral portion of the valve member, such as the edge or edge face of the valve member. The closable sealing portion may comprise a sealing interface between a portion of a major face of the valve member and the valve seat. Additionally, or alternatively, the closable sealing portion may comprise a sealing interface between a portion of an edge face of the valve member and the valve seat.

The flowpath may be configured to reduce or minimise a tilt angle required for contents of the container to reach the flowpath. For example, the flowpath may be located in a relatively low location (e.g. compared to other drinking containers, such as prior art containers), such as a low location on a plane of tilt of the container, the plane of tilt being a vertical plane along which the container may be tilted to access the container contents via the outlet. The flowpath may be close to a lid face. The flowpath may be low on the lid face when the container is held horizontal by the user or tilted towards horizontal by the user. The location of the flowpath may allow or more easily allow the container to be fully emptied, or more fully emptied, such as more fully emptied than at least some prior art containers. The flowpath may comprise an entry that is low. The flowpath may reduce or eliminate an angle beyond horizontal required for the last of the contents of the container to reach the outlet. In at least some examples, such as where one or more of the container walls are not straight (e.g. non-cylindrical), such as frusto-conical, the flowpath location may eliminate a requirement to tilt the container to horizontal for the container contents to reach the flowpath entry.

In at least some examples, the valve may be asymmetrical so as to provide the flowpath/s towards a particular side or location of the container. For example, the flowpath may be asymmetrical to match an asymmetry of the container. Particularly where the outlet (e.g. a spout) is positioned eccentrically, such as towards one side of the container, the flowpath may also be positioned eccentrically, such as towards that same side of the container. The valve may be asymmetrical so as to provide the flowpath towards one side of the valve. In other examples, the valve may be symmetrical so as to allow unilaterally a flowpath to the outlet, such as independently of an orientation or direction of the valve and/or container.

It will be appreciated than in at least some examples, a plurality of flowpaths may be provided. For example, the plurality of flowpaths may be split or separated by one or more walls, bosses, protrusions or the like. The walls, bosses, protrusions or the like may act as a filter, limiting a passage of particles to the valve and/or the outlet.

The valve member may be configured to prevent 'healing'. For example, an absence of apertures, slits or openings in the valve member may remove or reduce a possibility for the valve member to 'heal', such as during transit and/or storage (e.g. pre-sale in a shop or a warehouse), whereby prior art valve members with a slit/s can 'repair' so that the aperture is more difficult for the user to open, at least initially.

The valve member may comprise a dynamic valve member. The valve member may be dynamic so as to be deformable and/or moveable to open the valve. The valve may comprise a single dynamic valve member.

The valve member may comprise a minimum thickness to provide a minimum stiffness to enable deflection or deviation of the second valve member portion in response to deviation or deflection of the first valve member portion.

The valve member may comprise a maximum thickness to provide a minimum deformation in response to enable deflection or deviation of the first valve member portion in response to the activation force. The deformation may comprise bending.

The valve member may comprise an impermeable material, such as impermeable to water. The valve member may comprise a rubber, such as silicone rubber. The valve member may comprise a resilient material. The valve member may comprise a food-grade material, such as a FDA-approved material. The valve member may comprise a hydrophobic material. Additionally or alternatively, the valve member may comprise a hydrophilic material. The valve member may comprise a coating on at least one surface, such as on at least one major face. The valve member may comprise an additive. The valve member may comprise an antibacterial and/or antimicrobial property. For example, the valve member may be coated and/or impregnated with an antibacterial agent, such as a silver-based agent. In at least some examples, the bulk material of the valve member comprises an antibacterial agent evenly dispersed therein and/or thereon. The valve member and/or the valve seat may comprise one or more particular surface properties, such as conducive to forming a seal. For example, the valve member and/or the valve seat may comprise a particular surface texture. The valve member and/or the valve seat may comprise a particular surface roughness. For example the valve member and/or the valve seat may comprise a surface roughness below a maximum surface roughness, such that the valve member and/or the valve seat may comprise a smooth surface. The smooth surface may comprise a polished surface. In at least some examples, the maximum surface roughness of the valve member may be the same as the maximum surface roughness of the valve seat. In other examples, the maximum surface roughness of the valve member may be different from the maximum surface roughness of the valve seat. The maximum surface roughness of the valve member and/or the valve seat may be defined by a Ra value selected from one or more of: 10 μm; 5 μm; 2 μm; 1 μm; 0.5 μm; 0.05 μm; and 0.02 μm. For example, in at least some embodiments, the maximum surface roughness of the valve seat may be a Ra value of 0.05 μm; and the maximum surface roughness of the valve member may be a Ra value of 1 μm.

The valve member and/or the valve seat may comprise a maximum roughness depth defined by at least one of: single roughness depth (Rzi), mean roughness depth (Rz) or maximum roughness depth (Rmax); selected from one or more of: 50 μm; 30 μm; 20 μm; 10 μm; 5 μm; 2 μm; and 1 μm.

In at least some examples, the valve seat may comprise a greater stiffness than the valve member. The valve seat may be stiff, such as relative to the valve member. The valve member may be flexible, such as compared to the valve seat. The valve member may be resilient. The valve member may be flexible so as to deflect away from at least a portion of the valve seat so as to open the valve. The valve may comprise a valve recess into which the portion of the valve member may deflect to allow opening of the flowpath. The valve recess may form part of the flowpath, such as a portion of the spout, nozzle, mouth, straw or the like. The valve recess may allow suction of the portion of the valve member towards the outlet from the container, such as towards the source of suction or underpressure (e.g. a user's mouth). The valve may be configured to allow only a portion of the valve member to enter the valve recess. Allowing only a portion of the valve member to enter the valve recess may ensure that the valve member cannot pass out of the outlet and/or block the flowpath when under sufficient suction. The valve recess may include a portion to which the valve member cannot conform. For example, the valve recess may comprise a relief portion defining one or more channels for the flowpath, the relief portion being incompatible with the flexibility of the valve member under usable suction. The relief portion may comprise one or more angular changes smaller than a minimum bending radius of the valve member. The relief portion may comprise one or more ribs, the one or more ribs providing flow channels adjacent thereto when the valve is in the open configuration. The valve may be configured to prevent complete passage of the valve member into the valve recess and/or outlet, such as under typical human suction conditions. The valve member may comprise a property/ies to prevent complete passage into the valve recess and/or outlet, such as a particular thickness, stiffness, dimension/s (e.g. relative to the valve recess). Accordingly the valve member may be incapable of blocking the outlet when sufficient (human) suction is applied to the outlet. Similarly the valve member property/ies may prevent unintended separation from the valve member from the valve and/or container such as otherwise may represent a choke hazard.

The valve recess may allow the portion of the valve member to be deflected or deformed in or towards the direction of suction, such as towards the outlet. The valve member may be arranged such that the valve member is perpendicular or substantially perpendicular to the direction of suction, at least in the closed configuration. The valve member may be arranged such that the valve member is perpendicular or substantially perpendicular to the outlet, such as the spout, nozzle, straw or the like. The valve recess may form part of the spout, nozzle, mouth, straw or the like.

The valve may be configured to resist opening of the valve due to an internal pressure within the container. For example, the valve may be configured to resist opening of the valve due to pressure associated with a depth of fluid within the container, such as when the container is inverted or the valve is otherwise subjected to a depth pressure of the fluid contents of the container. The valve member may comprise a larger surface area, such as of the major face, that is engagable with the valve seat, at least in the closed configuration, than a surface area of the valve member, such as of the major face, that is not engageable with the valve seat, at least in the closed configuration. Accordingly the valve may comprise a relative surface area of the valve member that is engageable with the valve seat than a surface area of the valve member that is not engageable with the valve seat. The valve may be configured such that a pressure, such as associated with a depth pressure of fluid in the container, acts to increase a force of engagement of the valve member against the valve seat. The valve may be configured to increase the valve seating force more than a force pushing the valve member into the valve recess, such as when the valve is subjected to an internal pressure, or primarily an internal pressure. The valve may comprise a greater area of engagement and/or contact between the valve seat and the valve member than an area of the valve member that is exposed to suction via the valve recess. Providing a greater area of contact and/or engagement than exposed to the valve recess may ensure that a net force associated with an internal container pressure, or primarily an internal pressure (e.g. in the absence of suction through the outlet), does not open the valve, or does not open the valve substantially. The internal pressure acting against the valve member may press the valve member against the valve seat such that a resistance to movement of the valve member relative to the valve seat is increased, such as by an increased friction between the valve member and the valve seat. The internal pressure may provide a normal force to increase friction between the valve member and the valve seat.

In at least some examples, an edge portion of the valve member may pass at least partially into the valve recess in the open configuration to provide a portion of the flowpath, the portion of the flowpath being between the valve seat and the edge portion of the valve member. Reconfiguring the valve to the open configuration may comprise the edge portion passing at least partially into the valve recess. The edge portion may be an external or outer edge portion, such as defining an outer periphery of the valve member.

In at least some examples, the valve may comprise a vent. The vent may at least assist in balancing a pressure differential across the valve, such as when the valve is in an open configuration. The vent may be configured to allow air to enter the container as fluid (e.g. liquid) is extracted from the container through the outlet. The vent may provide a discrete flowpath from the outlet flowpath. The vent and the outlet may be distinct. The vent may be located away from the outlet so as to reduce likelihood of the vent being covered by a user's mouth. The vent may define an air inlet into the container. The vent may be selectively closable by the valve. The vent may be selectively openable and closable by the valve corresponding to the opening and closing of the outlet flowpath by the valve. The valve member may be configured to seal both the outlet flowpath and the vent, when in the closed configuration. The valve member may be configured to open both the vent and the outlet flowpath when reconfigured from the closed to the open configuration. The valve may be configured to open both the outlet flowpath and the vent by the user's suction through the outlet. The valve may be configured to open both the vent and the outlet flowpath by the application of only suction by the user through the outlet. In at least some examples, the movement of the valve member, such as towards the outlet or valve recess, may move the valve member so as to open the valve. The movement of the valve member towards the source of suction, may slide the valve member to reveal a venthole of the vent. The venthole may comprise a two-way vent, when open. Alternatively, the venthole may comprise a one-way vent when open, allowing the passage of fluid in only a single direction (e.g. into the container). The valve may be configured to seal the vent and the outlet with a single valve member. In at least some examples, the vent may be openable under a sufficient pressure differential across the vent. For example, when an external pressure, such as atmospheric pressure is sufficiently greater than an internal pressure (in the container), then the pressure differential may cause the valve member to deflect or deform at the vent to open the vent allow the passage of fluid (e.g. air) into the container.

The valve member may be planar or substantially planar. The valve member may be planar or substantially planar at least when in a rest state, such as in a disassembled configuration.

In at least some examples, the valve member may be planar or substantially planar when in the closed configuration, assembled in the valve. The valve member may define a seal in a single plane, when in the closed configuration. The valve member may define a circumferential seal in the single plane around the flowpath, when in the closed configuration. The seal may be broken or opened, by breaking the seal at at least a portion of the circumferential seal. In at least some examples, the seal may be opened by breaking the seal at only the portion of the circumferential seal.

In other examples, the valve member may be non-planar when in the closed configuration, assembled in the valve. For example, the valve member may be curled or curved in at least one direction when assembled in the valve, in the closed configuration.

Curling the valve member may assist in providing the valve member with a bias or pretension in a particular direction, such as to bias the valve member towards the closed configuration. The valve member may be curled or curved in a single direction when assembled in the valve, in the closed configuration. For example, the valve member may define a cross-section comprising of a smooth curve, an arc, spiral, circle, oval, or portion thereof. In at least some examples, the cross-section may be the same along the length of an axis perpendicular to the cross-section, when in the closed configuration. Indeed the valve member may define a (hollow) round prism, such as a cylinder or oval prism, or a portion thereof, when assembled in the valve in the closed configuration. In at least some examples, the valve may be reconfigurable from the closed configuration to the open configuration by varying a radius of at least a portion of the cross-sectional curve. For example, the radius of the valve member may increase (or decrease in other embodiments) at at least a portion along the axis perpendicular to the cross-section to open the valve. The radius of the valve member may increase (or decrease in other embodiments) along the entire axis perpendicular to the cross-section to open the valve In the closed configuration the valve member may define a prismic volume, such as a cylinder or oval prism, with a flowpath being established in the open configuration between an interior and an exterior of the prismic volume, such as transversely to a longitudinal axis of the prism. For example, at least a portion of the curled or curved valve member may uncurl (or curl further) from the closed to the open configuration to open a flowpath in at least a portion of a seal along a longitudinal length of the prism. The longitudinal axis of the prism may be parallel to or the same as the axis transverse to the cross-section. In at least some examples, the prism may be collinear with the spout, nozzle, mouth, straw or the like. In alternative examples, the prism may be perpendicular to the spout, nozzle, mouth, straw or the like.

In at least some examples, the valve seat may comprise a further portion of the valve member. The further portion of the valve member may define the valve seat. For example, the valve member may be deformed in the closed configuration so as to be self-sealing, a first portion of the valve member sealingly seating against a second portion of the valve member. In at least some examples, the valve member may be rolled or curled such that a portion of a first major surface of the valve member seats against a portion of a second major surface of the valve member. The at least a portion of the valve member that moves to selectively open and close the flowpath may seat against that further portion of the valve member in the closed configuration.

The valve may comprise a pressure-responsive valve. The valve may be selectively openable in response to a pressure differential across the valve member, such as between pressure within the container and pressure external to the container. The valve may be only openable, or at least more easily openable—such as with a lower pressure differential, in at least one direction. The valve may comprise a demand valve. The valve may comprise a suction-operated valve. In at least some examples, a cross-sectional area of the flowpath may increase with suction. The cross-sectional area of the flowpath defined by the valve member may increase proportionally (such as directly, exponentially or logarithmically) with suction. In at least some examples, increasing suction may cause increased movement of the at least a portion of the valve member away from the valve seat. The cross-sectional area of the flowpath associated with the opening by the movement of the at least a portion of the valve member may be variable. The cross-sectional area of the flowpath may be variable between zero or substantially zero (closed) when no suction is applied (e.g. subject to atmospheric pressure) and a maximum cross-sectional area (fully open) when subjected to a human-induced suction or underpressure, such as may be associated with a baby, infant, child or adult sucking, as appropriate.

The flowpath may be selectively closable by a reduction in suction. The flowpath may be automatically closable in response to a reduction in or cessation of user suction. The flowpath may be automatically closable by the valve member. The valve member may be biased towards the closed configuration. The valve member may be resilient. The valve member may comprise an internal resilience to bias the valve member. For example, the valve member may comprise a resilient material that is deformed or deflected towards the open configuration by suction and reverts to the closed configuration by a resumption of its natural form in a rest position in the valve.

The valve may comprise a leak-proof or a leak-resistant valve. The valve may provide a selective seal for selectively opening and closing the container, such as to selectively allow the flow of fluid into and/or out of the container. In at least some examples, the valve may comprise a one-way valve. In certain examples, the valve may provide a low-leak seal, such as allowing a slow or small leakage of a portion of the contents when in a sealing configuration (into and/or out of the container as applicable). Providing a low-leak seal may assist in balancing a pressure differential across the valve, such as when the valve is in a closed or sealing configuration. Providing a low-leak seal may provide a suitable seal for many uses, whilst potentially allowing manufacturing and/or hygiene and/or cleaning and/or cost improvements, such as compared to a fully sealing no-leak valve.

In at least some examples, the valve member may be associated with a straw. The valve member may be mounted in or to the straw. For example, the valve member may be mounted to or towards an end portion of the straw. In other examples, the valve member may be mounted at or in an intermediate portion of the straw.

The valve may be configured to allow air inflow into the container, such as to balance pressure for liquid outflow from the container. In at least some examples, the valve member is configured to allow air inflow.

The air inflow may be along substantially the same flowpath as the liquid outflow. The air inflow may be along substantially the same flowpath as the liquid outflow in an opposite direction to the liquid outflow. In addition, or alternatively, the container may provide an additional or alternative air inflow flowpath. For example, the valve member may provide, such as selectively provide, an additional or alternative flow path for air inflow, discrete from the flowpath for liquid outflow from the container. In at least some examples, the container may comprise a liquid outflow flowpath and a discrete air inflow flowpath.

The air inflow may be simultaneous with the liquid outflow. For example, air may flow or bubble into the container whilst liquid is flowing out of the container. Additionally or alternatively, the air inflow and liquid outflow may occur sequentially. For example, particularly where the air inflow is along the same flowpath as the liquid outflow, the air inflow may occur after a period of liquid outflow. The liquid outflow may generate an underpressure within the container, such that the container draws in air inflow when the suction at the outlet of the container drops or ceases (e.g. when the user stops sucking). The valve member may be configured to allow air inflow into the container whilst the valve member is activated by suction from the user. In at least some embodiments, the valve member may be configured to allow air inflow into the container only whilst the valve member is activated by suction from the user. In at least some other embodiments, the valve member may be configured to allow air inflow into the container through an air flowpath separate from the outflow flowpath. In at least some embodiments, the valve member is configured to deflect or deform so as to provide an air inflow flowpath from a separate air inflow opening.

The container may comprise a folding spout. The folding spout may allow the spout to seal, such as to provide a seal when not in use (e.g. stored) when in free flow configuration and/or so as to provide an optional additional seal when in demand configuration. The folding spout may allow the container to adopt a more compact non-use configuration, such as for storage and/or transportation. The folding spout may comprise a hinge, such as a mechanical hinge and/or an integral hinge (e.g. a flexible spout).

According to a further aspect there is provided a valve member for the valve of any other aspect, example, embodiment or claim.

According to a further aspect there are provided at least some examples of a container comprising the valve and/or valve member of any other aspect, example, embodiment or claim.

The container may comprise a drinking vessel. The drinking vessel or container may comprise one or more of: an openable container; an enclosed or enclosable container; a bottle; a cup; a sippy cup; a toddler drinking vessel; a baby drinking vessel; a baby bottle; a sports bottle; a reusable drinking vessel; a disposable drinking vessel.

The drinking vessel may be configured to inhibit or mitigate against unhygiene, such as bacterial growth and/or dirt/debris accumulation/s. The drinking vessel may be configured for one or more of: handwashing; dishwasher washing; disassembly;

reassembly; valve access; valve member removal; and/or valve member replacement.

In at least some examples, the container may comprise a re-usable container. For example, the container may comprise a reusable drinking vessel, such as a reusable sippy cup, baby bottle, toddler cup, sports bottle or the like. In other examples, the container may comprise a disposable container, such as a single-use container. In at least some examples, the container may be microwaveable and/or dishwasher-safe. The container may be configured for cleaning. The container may comprise a cleaning configuration. For example, the container may be reconfigurable to provide access to the valve, such as by opening or removing the closure. The cleaning configuration may provide access to an inside of the container. The cleaning configuration may allow at least partial removal or separation of one or more of the components of the valve. For example, the valve member may be at least partially removable from the valve seat. In at least some examples, the valve member may be fully removable.

One or more or all parts or components of the valve and/or drinking vessel, such as all those components in possible contact with a drinking fluid, may comprise an appropriate healthy and/or hygienic material. For example, at least some example drinking vessels comprising the valve may consist of only food-grade materials in accordance with food safety under at least EU and/or US FDA regulations. At least some example drinking vessels may comprise materials free from one or more of: BPA; endocrine disrupter chemicals; chemicals with hormone-like effects; phthalates; leachable chemicals. According to a further aspect there is provided a method of manufacturing a valve, such as a valve according to any other aspect, embodiment, example or claim.

The method may comprise manufacturing a valve member from a sheet material. The method may comprise fabricating the valve member from the sheet material by detaching a portion from a remainder of the sheet material, such as by one or more of: cutting; stamping; laser-cutting; hot-stamping; pressing; or the like.

The method may comprise detaching the portion from the sheet material as a whole continuous portion. The method may comprise providing a single, integral sheet for each valve, such that each valve only comprises one sheet of valve material.

The method may comprise forming the valve member with a continuous surface, such as a continuous, unbroken surface formed within an outline periphery, the outline periphery defined by the border of extraction from the remainder of the sheet material. The method may comprise forming the valve member without any internal indentations, apertures, slits, or the like in the valve member, within the outline periphery. The method may comprise assembling the valve member in the valve without any internal indentations, apertures, slits, or the like in the valve member.

Thus, according to at least some examples, the valve member may be formed by merely cutting or stamping a simple two-dimensional shape from a sheet material. The two-dimensional shape may comprise a tessellating shape. The tessellating shape may be similar or identical for a plurality of valve members. The shape may comprise a rectangle. Each valve member formed from the sheet material may comprise the same two dimensional geometric shape. For example, each valve member formed from the sheet material may comprise a rectangle of similar dimensions.

According to a further aspect there is provided a method of manufacturing the device or apparatus of any other aspect, example, embodiment or claim. The method may comprise additive printing, 3D printing. The method may comprise transferring manufacturing instructions, such as to or from a computer (e.g. vie internet, e-mail, file transfer, web or the like). In at least some examples, the method may comprise printing at least some of the components of the valve and/or the container. For example, the method may comprise printing all of the components of the container and/or the valve, with the exception of the valve member. The valve member may be supplied in sheet format, such as for assembly into the 3D printed valve (and optionally 3D printed container). The valve member may be supplied in a final-use configuration. Alternatively, the valve member may be supplied in a sheet format, such as for cutting or otherwise forming the valve member from the sheet.

Another aspect of the present disclosure provides a computer program comprising instructions arranged, when executed, to implement a method in accordance with any other aspect, example or embodiment. A further aspect provides machine-readable storage storing such a program.

The invention includes one or more corresponding aspects, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the device of one aspect may comprise features of any other aspect). Optional features as recited in respect of a method may be additionally applicable to an apparatus or device; and vice versa.

In addition, corresponding means for performing one or more of the discussed functions are also within the present disclosure.

It will be appreciated that one or more embodiments/aspects may be useful in at least partially sealing.

The above summary is intended to be merely exemplary and non-limiting.

Various respective aspects and features of the present disclosure are defined in the appended claims.

It may be an aim of certain embodiments of the present disclosure to solve, mitigate or obviate, at least partly, at least one of the problems and/or disadvantages associated with the prior art. Certain embodiments or examples may aim to provide at least one of the advantages described herein.

BRIEF DESCRIPTION OF THE DRAWINGS

These and other aspects of the present invention will now be described, by way of example only, with reference to the accompanying drawings, in which.

DETAILED DESCRIPTION

Figure 1:
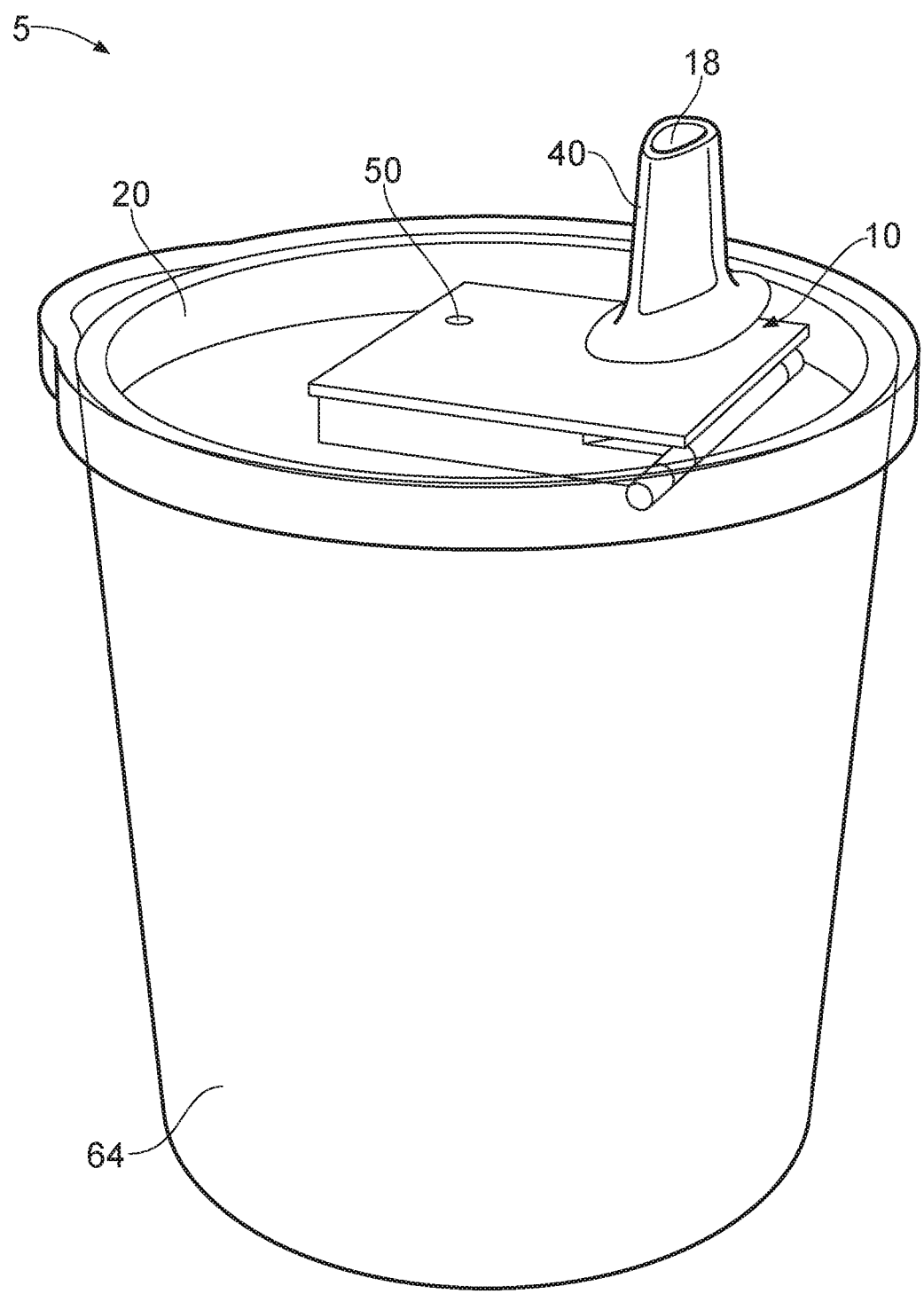
FIG. 1 is a perspective view of a container 5 comprising a valve 10 according to a first example of the present disclosure.

Referring to FIGS. 1 through 13, there is provided a valve 10, here for selectively sealing a container 5, as described in further detail below.

As shown here, the container 5 comprises a drinking vessel, such as a sippy cup or toddler cup. It will be appreciated that in other examples, the container 5 may comprise a baby bottle, sports bottle or the like.

The valve 10 comprises a valve member 12. The valve 10 comprises a valve seat 14. The valve 10 defines a flowpath 16. The flowpath 16 is defined between the valve member 12 and the valve seat 14. The flowpath 16 is selectively openable in response to suction generated by a user. The flowpath 16 is selectively openable and closable by movement of at least a portion of the valve member 12 relative to the valve seat 14. The movement of the at least a portion of the valve member 12 comprises deformation and/or deflection of the at least a portion of the valve member 12. The movement of the at least a portion of the valve member 12 is in a direction away from the valve seat 14 to open the flowpath 16. Here, the movement of the at least a portion of the valve member 12 to open the flowpath 16 is associated with leverage caused by the movement of at least another portion of the valve member in a direction generally towards an outlet 18 from the container 5, such as the suction source generated by the user. In the example shown in FIGS. 1 to 13, the movement of the at least another portion of the valve member 12 to open the flowpath 16 is in a direction generally transverse to the flowpath 16, such as perpendicular.

Figure 8:
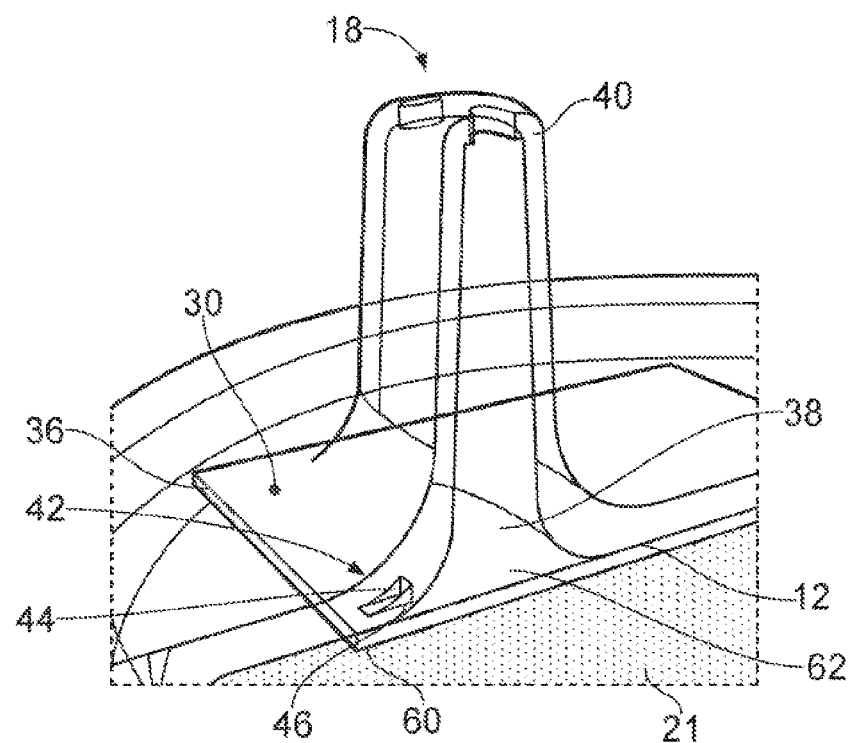
FIG. 8 is a partial cutaway view of the portion of the lid of FIG. 3 with the retainer 22 of the valve 10 omitted, showing a cross-section of a spout and the valve member 12 with the valve member 12 in the closed configuration, and a fluid within the container 5.
Figure 9:
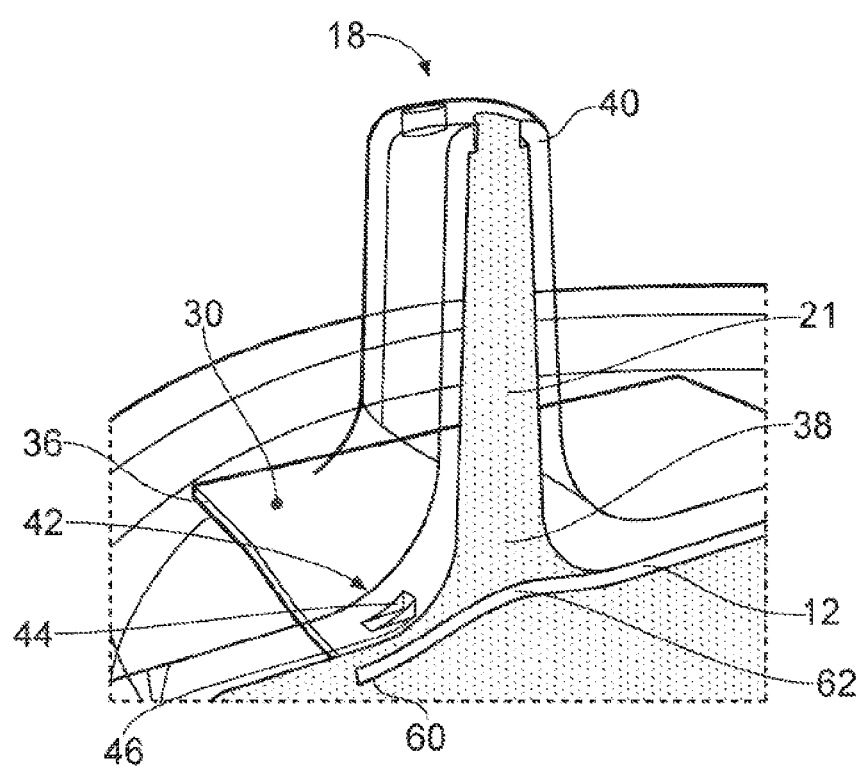
FIG. 9 is a partial cutaway view of the portion of the lid of FIG. 3 with the retainer 22 of the valve 10 omitted, showing the cross-section of the spout and the valve member 12 with the valve member 12 in the open configuration, and a flowpath 16 of the fluid from the container 5 into the spout.

The valve member 12 is located or locatable at an interior of the container 5, which is shown here as on an interior wall of a lid 20. Opening of the valve 10 requires overcoming friction. The valve 10 is configured to maintain at least a portion of the seal using friction. Here, the friction comprises static friction and kinetic or dynamic friction. Here, the friction comprises dry friction and lubricated friction. For example, in at least some embodiments, the valve 10 comprises a liquid layer between at least a portion of the valve member 12 and the valve seat 14. The liquid comprises a portion of the liquid contents 21 of the container 5. For example, where the container 5 is a drinks container 5, the liquid comprises a layer of the drinkable liquid, such as shown in FIGS. 8 and 9. The valve 10 is configured, in a closed configuration, to maintain the valve member 12 against the valve seat 14 at least partially by friction between the valve member 12 and the valve seat 14.

The valve member 12 forms the seal at least partially using stiction. The valve 10 provides a resistance to opening the seal when the valve 10 is closed, the resistance to opening being at least partially associated with a stiction between the valve member 12 and the valve seat 14. Opening the valve 10 so as to provide the flowpath 16 for fluid to the outlet 18 comprises overcoming stiction between a stiction portion of the valve member 12. The stiction is between the stiction portion of the valve member 12 and another part of the valve 10, such as shown in FIGS. 1 to 13 as stiction between the valve member 12 and the valve seat 14. In other examples, such as shown in FIGS. 19 to 22 for example, the stiction to be overcome to open the valve 310 is between the stiction portion of the valve member 312 and a further stiction portion of the valve member 312.

As shown in FIGS. 1 through 13, the valve 10 is at least partially maintained in the closed configuration by an attraction between the valve member 12 and the valve seat 14. The valve member 12 and valve seat 14 is at least partially maintained in the closed configuration by a liquid film, thin liquid film, or ultra-thin liquid film. Here, the valve member 12 and valve seat 14 can also be at least partially maintained in the closed configuration by a meniscus effect, or a micro-meniscus effect. When used for a drinking liquid, such as shown in FIGS. 8 and 9, the valve member 12 and valve seat 14 is at least partially maintained in the closed configuration by a capillary bridge. In all of the examples shown here, in FIGS. 1 through 22, the valve 10 is at least partially maintained in the closed configuration by a stiffness of the valve member 12. The valve 10 is at least partially reconfigured from the open to the closed configuration by a stiffness of the valve member 12.

Figure 2:
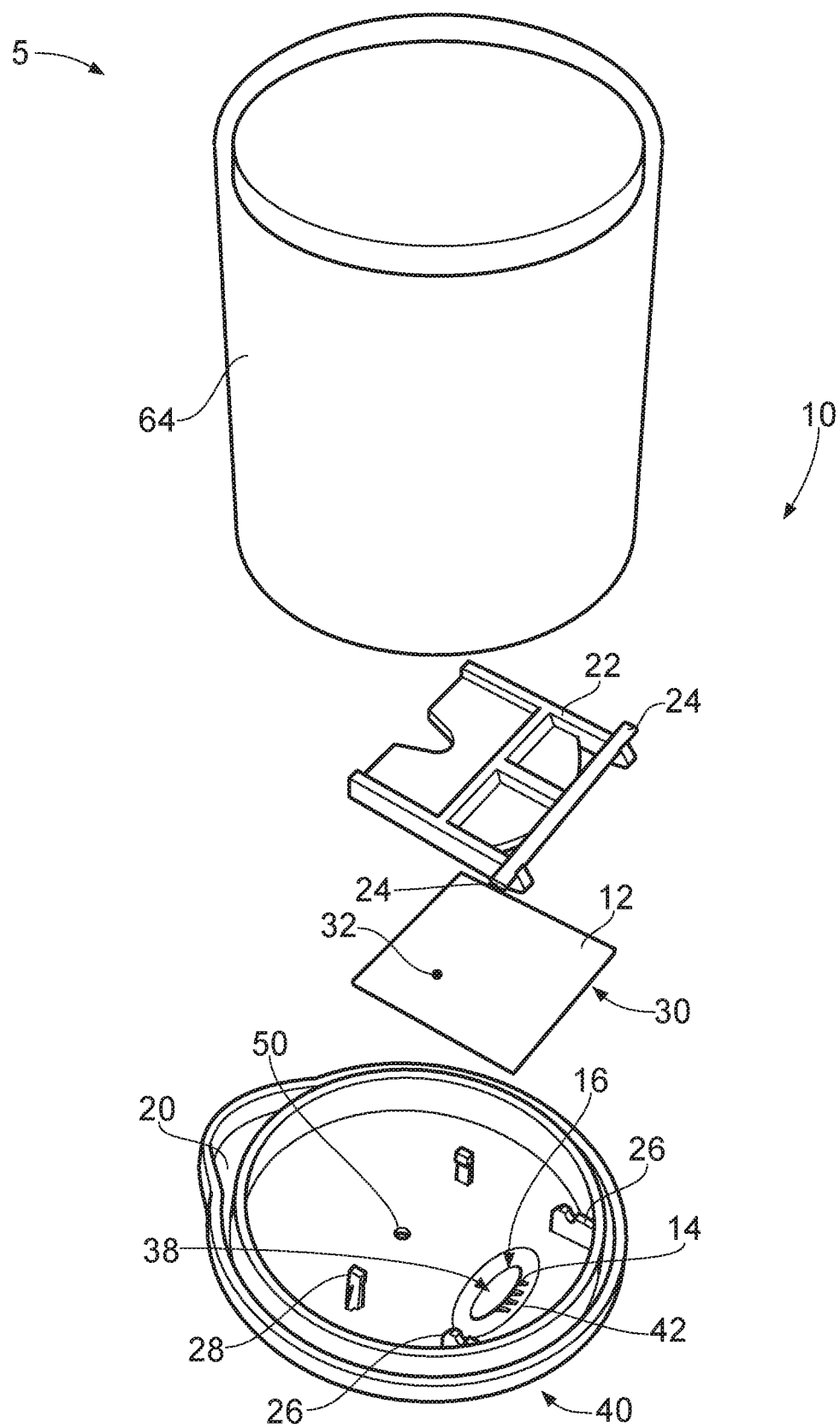
FIG. 2 is an exploded view of the container 5 and valve 10 of FIG. 1.
Figure 3:
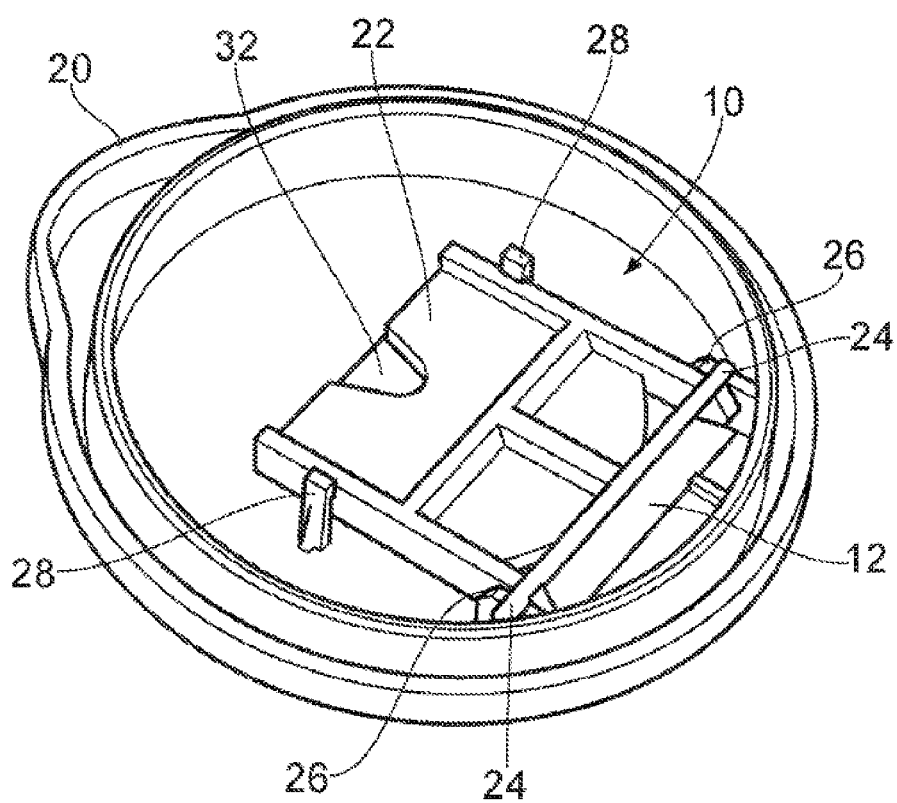
FIG. 3 is an isometric view of a lid of the container 5 of FIG. 1 with the valve 10.

As shown clearly in FIGS. 2 and 3, the valve 10 comprises a retainer 22 for retaining the valve member 12 relative to the valve seat 14. The retainer 22 is located or locatable at an interior of the container 5, such as shown here on an interior of the lid 20 of the container 5. The retainer 22 assists in defining a compartment or chamber for housing the valve member 12. The compartment or chamber comprises an open chamber or cage. The retainer 22 allows the valve member 12 to move within the compartment or chamber. The retainer 22 is configured to allow at least a portion of the valve member 12 to move along at least a portion of the retainer 22 and/or the valve seat 14. Here, the retainer 22 is configured not to press the valve member 12, or at least not all of the valve member 12, against the valve seat 14. In the example of FIGS. 1 to 13, at least a portion of the retainer 22 is spaced from the valve seat 14 so as to define a greater dimension of the chamber or compartment than a corresponding dimension of the valve member 12. For example, the retainer 22 is arranged relative to the valve seat 14 to define a height or thickness of the compartment or chamber greater than a corresponding height or thickness 34 of the valve member 12. Accordingly, the valve 10 comprises a gap between the valve member 12 and the retainer 22 in at least some configurations. The valve 10 comprises a gap between the valve seat 14 and the retainer 22. The valve 10 comprises the gap and the valve member 12 between the valve seat 14 and the retainer 22. In other words, the valve member 12 and the gap are sandwiched between the valve seat 14 and the retainer 22. In at least some circumstances, the gap is located between the valve member 12 and the retainer 22 in at least the closed configuration. The gap is smaller than at least a portion of a cross-section of the flowpath 16 when open.

The retainer 22 maintains at least a portion of the valve member 12 relative to the valve seat 14 in at least the closed configuration, as shown in FIG. 3. The retainer 22 is configured to prevent unintended separation of the valve member 12 from the valve 10, such as relocation of the valve member 12 away from the vicinity of the valve 10, such as to another part of the container 5. The retainer 22 loosely retains the valve member 12 in the vicinity of the valve seat 14. The retainer 22 is configured to prevent dislocation or displacement of the valve member 12 from the vicinity of the valve seat 14.

The retainer 22 is selectively movable relative to the valve seat 14. For example, the retainer 22 is selectively movable to open the chamber or compartment housing the valve member 12. The retainer 22 is selectively openable to allow access to the valve member 12, such as for one or more of: assembly; disassembly; maintenance; cleaning; repair; replacement; and inspection. The retainer 22 is at least partially detachable to allow access to the chamber or compartment and/or the valve member 12. Although not shown, as will be appreciated with the example of FIGS. 2 and 3, the retainer 22 is partially detachable to allow access to the compartment or chamber and/or the valve member 12 without necessarily completely detaching or separating the retainer 22. Allowing access to or for the valve member 12 without completely detaching the retainer 22 allows inspection, cleaning, replacement, etc. of the valve member 12 and/or the valve seat 14, whilst reducing a likelihood of misplacement or loss of the retainer 22 whilst the valve member 12 and/or the valve seat 14 is inspected, cleaned, replaced, etc. The retainer 22 is selectively movable between at least two configurations: a first configuration being a retaining configuration whereby the valve member 12 is retained relative to the valve 10 seat (as shown in FIG. 3); and a second configuration being an access configuration whereby the valve seat 14 and/or valve member 12 is/are accessible, such as for inspection or cleaning (not shown). The retainer 22 is selectively movable between the first and second configurations, such as by a user operation. In the example shown in FIGS. 2 and 3, the retainer 22 is partially detachable from the container 5, here partially detachable from the valve seat 14, from the first configuration to the second configuration. Partial detachment comprises unclipping a portion of the retainer 22. Here, the retainer 22 is pivoted open from the first configuration to the second configuration about pivots 24 that clip into corresponding pivot mounts 26 in the lid 20, the retainer 22 only being partially detached, with the retainer 22 remaining attached via the pivots 24. Upon completion of operation/s with the retainer 22 in the second configuration, the retainer 22 is fully re-attached, such as by closing the retainer 22 and securing the retainer 22 in place, such as by clipping or snap-fitting into place into retainer clips 28 in the lid 20. As shown in FIG. 2, here the retainer 22 is further fully detachable by removal from the pivots 24, such as by also unclipping the retainer 22 from the pivots 24. The retainer 22 is re-attachable by clipping in the pivots 24 and pivoting the retainer 22 to the retaining configuration. The retainer 22 is held in the retaining configuration by the clips 28, which are integrated into the lid 20 here. The retainer 22 is configured to inhibit child access to the valve member 12. For example, the retainer 22 is secured in the retaining configuration so as to require adult manipulation, such as with adult dexterity and/or force, to reconfigure to the access configuration. It will be appreciated that in other embodiments, the retainer may not be so reconfigurable, such as in a disposable container (not shown) where the retainer is ultrasonically welded to the lid, with the valve member being assembled in the valve by insertion through an aperture in or adjacent the retainer, with the valve member then expanding to a use state whereby it does not pass back out through the aperture.

As clearly shown in FIGS. 4, 5, 6 and 7, the valve member 12 comprises a membrane, being a single sheet here. The valve member 12 here comprises a uniform thickness in two directions or axis, the two directions or axis being perpendicular with respect to each other. The valve member 12 is free from: indentations; apertures; slits; and protrusions. The valve member 12 comprises a first major face 30 and a second major face 32. Both of the first and second major faces 30, 32 each comprises a continuous major surface.

The continuous major surface of the first major face 30 is configured to matingly engage the valve seat 14. The first major face 30 comprises a continuous surface portion at least over an area corresponding to an openable area of the major face 30 that engages with the valve seat 14 when closed. Each continuous major face 30, 32 is uninterrupted, being free from all of: indentations, apertures, slits, and/or protrusions or the like. The pair of continuous major faces 30, 32 define opposite external surfaces facing outwards in opposite directions, such as upwards and downwards or front and back. The first major face is for engaging the valve seat 14 and the second major face defines an opposite external valve member 12 surface, such as for engaging the retainer 22 (see e.g. FIG. 3).

Here, the valve member 12 comprises isotropic properties in all directions of the major face 30 (e.g. length and breadth and diagonally), such as isotropic flexibility. Here, the valve member 12 comprises only the two major faces 30, 32, being separated by the thickness 34 of the sheet. The thickness 34 of the sheet defines edges 36 around a periphery or outline of the major faces 30, 32. The major faces 30, 32 are considerably greater in magnitude in two directions (e.g. length & breadth, or X and Y) than the magnitude (e.g. thickness 34) of the edges 36 of the valve member 12. The valve member 12 is free from apertures, such as slits, holes, perforations or other openings, in both the closed and the open configurations.

Figure 4:
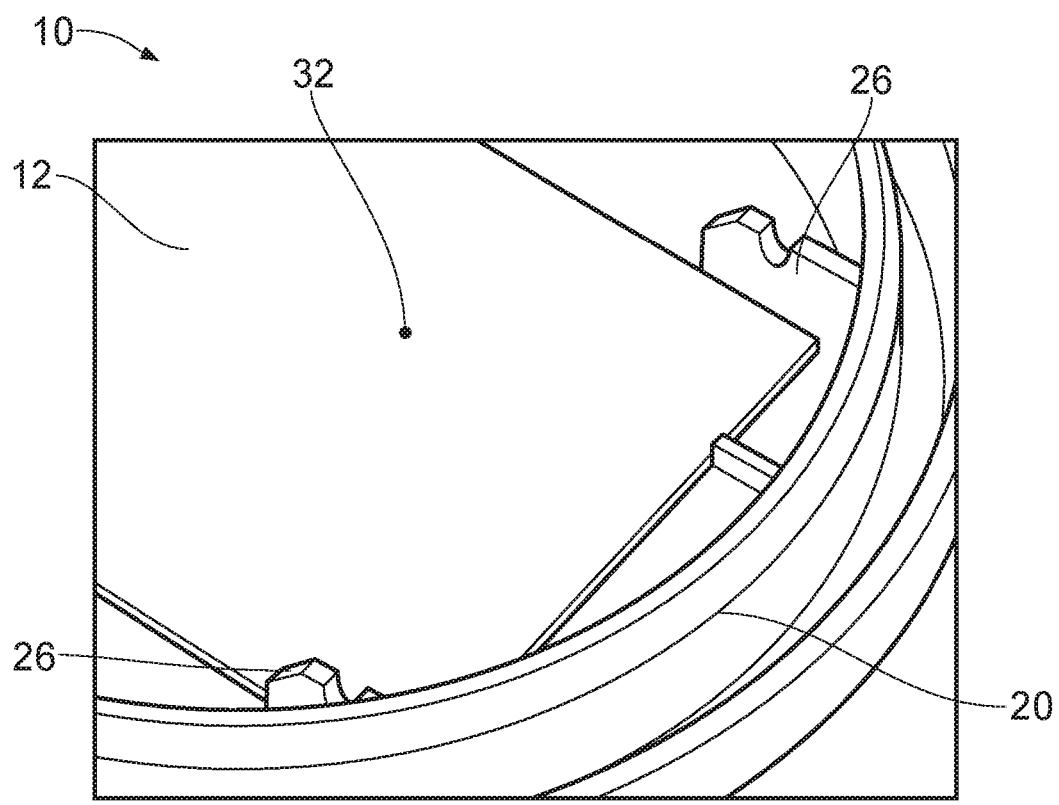
FIG. 4 is a detailed view of a portion of the lid of FIG. 3 with a retainer 22 of the valve 10 omitted, showing a portion of a valve member 12, with the valve member 12 in a closed configuration.
Figure 5:
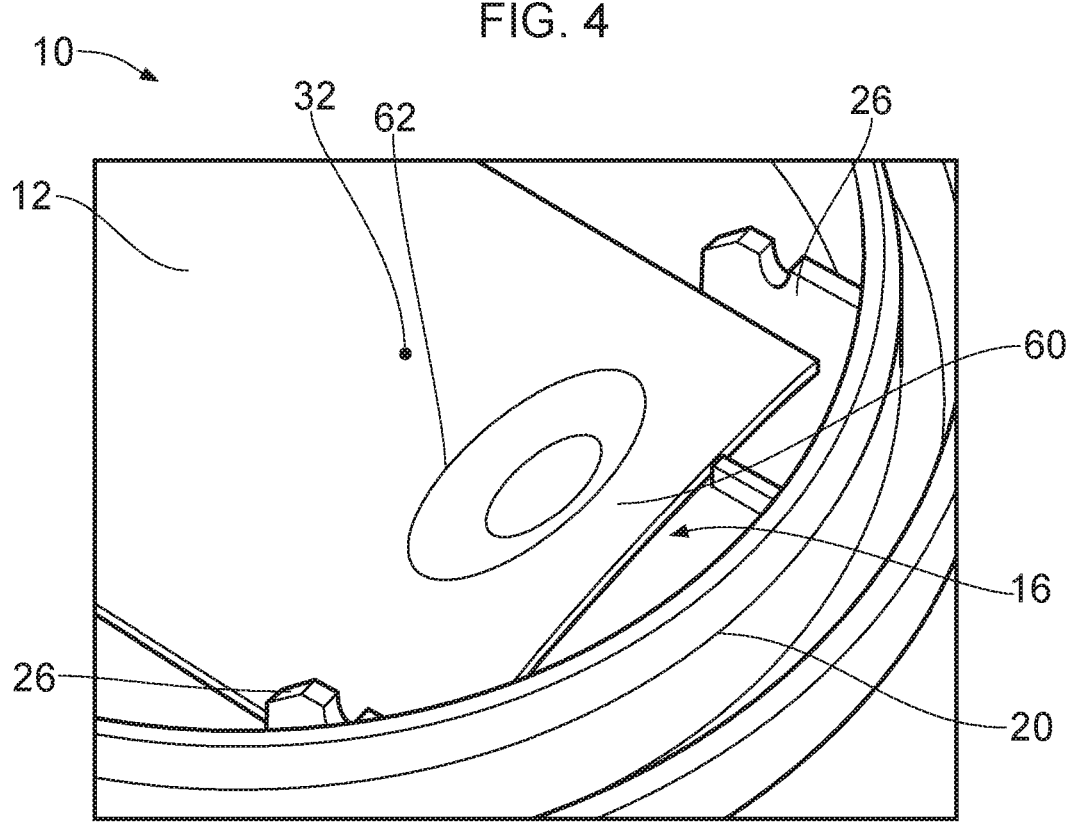
FIG. 5 is a detailed view of the portion of the lid of FIG. 4 with the valve member 12 in an open configuration.
Figure 6:
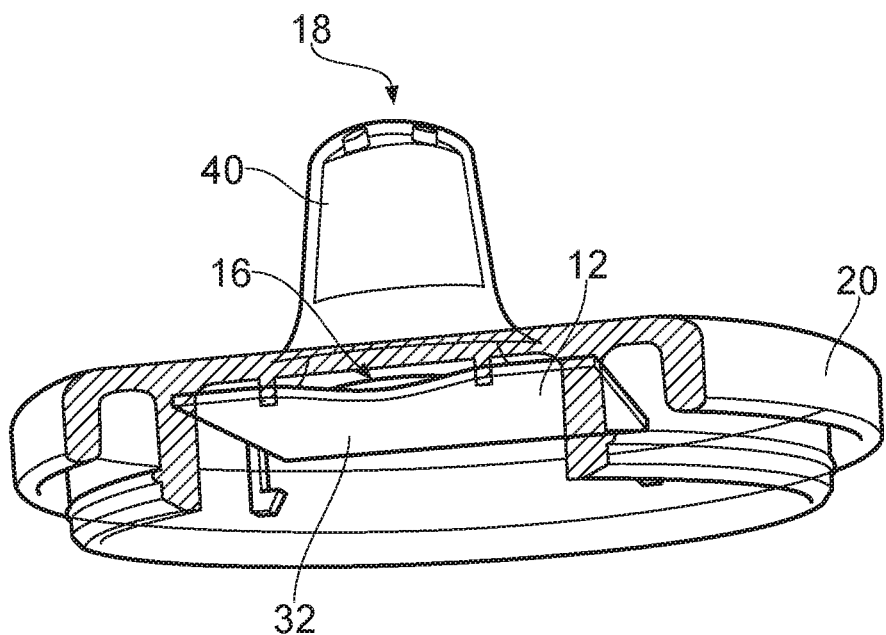
FIG. 6 is a partial cutaway view from below of the portion of the lid of FIG. 3 with the retainer 22 of the valve 10 omitted, showing a portion of a valve member 12, with the valve member 12 in the open configuration.
Figure 7:
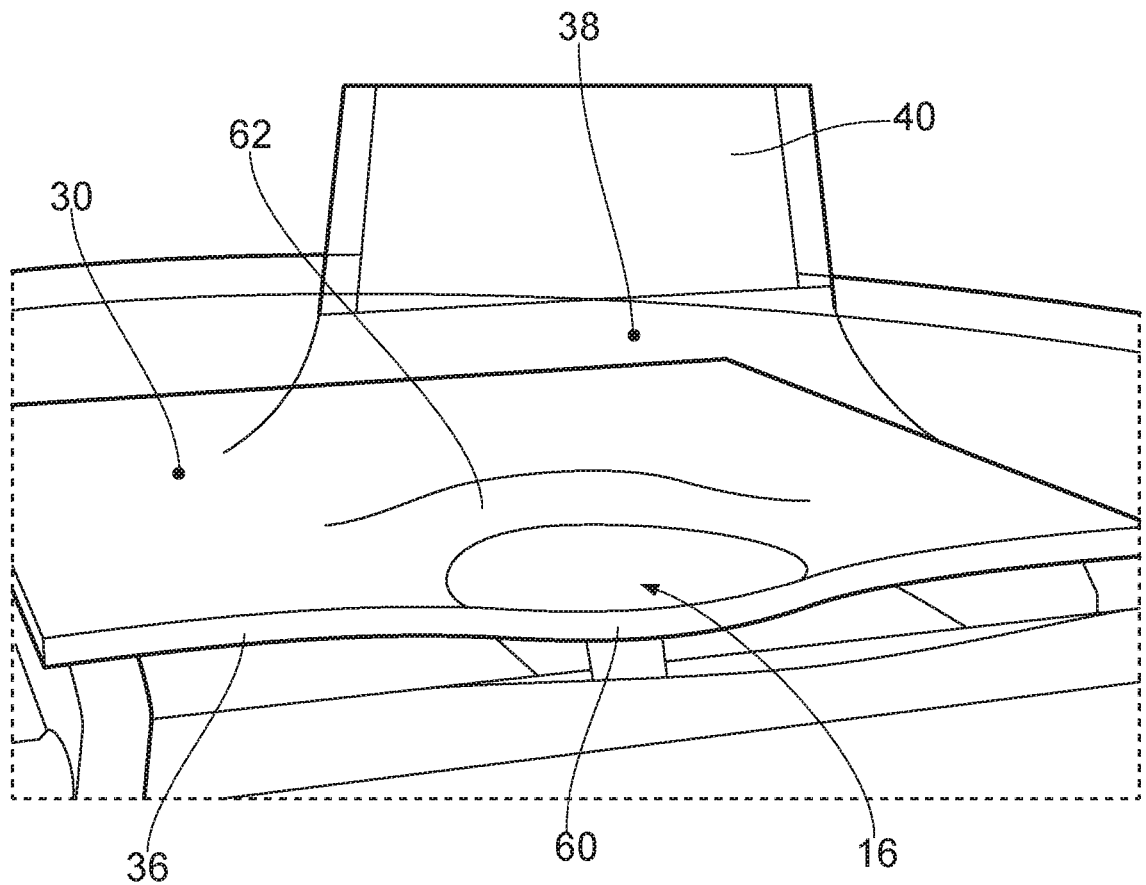
FIG. 7 is a detail view, from above, of the portion of the lid of FIG. 3 with the retainer 22 of the valve 10 omitted, with the valve member 12 in the open configuration.

In the closed configuration, the valve member 12 comprises uniform cross-sections along two entire axes, each axis extending in a respective discrete direction, such as x and y or width and length. Here, in the closed configuration, the valve member 12 comprises uniform cross-sections along three entire axes, each axis extending in a respective distinct direction, such as x and y and z or width and length and height. Each axis is perpendicular to at least one other axis. Accordingly, the valve member 12 here has a uniform cross-section along the entire x-axis, a uniform cross-section along the entire y-axis, and a uniform across-section along the entire y-axis, when in the closed configuration, as shown in FIG. 4. Reconfiguring the valve member 12 to the open configuration of FIG. 5 comprises altering the valve member 12 cross-section along at least a portion of the axis in one or more directions—here, primarily when viewed along the x and y axes, as particularly evident in FIGS. 6 and 7.

As shown in FIGS. 5, 6, 7 and 9, when activated, the valve 10 provides a flowpath 16 that does not pass through or otherwise require an aperture in the valve member 12. The valve 10 does not require an aperture defined solely by or within the valve member 12. In contrast to other valves (e.g. conventional valves, not shown) whereby an aperture, such as a slit, in a valve member 12 is selectively openable, the valve 10 of the present disclosure is activated by selectively opening a flowpath 16 between the valve member 12 and the valve seat 14. The valve 10 is selectively openable by selectively separating at least a portion of the valve member 12 from the valve seat 14. The portion of the valve member 12 is separable from the valve seat 14 by deformation of the valve member 12 under suction. Here, the opened flowpath 16 is in an ideal location, close to the lid face, and low on the lid face when the cup 5 is held horizontal by the user or tilted towards horizontal. Accordingly such a location minimises the tilt angle of the cup. This makes dinking for the child easier and ensures more of the drink is available to the child. For example, in other cups (not shown) where the valves are not flush with lids and/or the flowpaths are closer to the centre of the lid than shown in FIGS. 1 to 12, the user is required to tilt the cup more or even fully upturn the cup to get more drink out. Furthermore, the location of the flowpath 16 shown in the example of FIGS. 1 to 12, allows or more easily allows the cup to be fully emptied, or more fully emptied, than such other cups. It will be appreciated that in other examples of the present disclosure (e.g. non-child embodiments, such as adult sports bottles, not shown), the flowpath may require a higher tilt angle.

Figure 17:
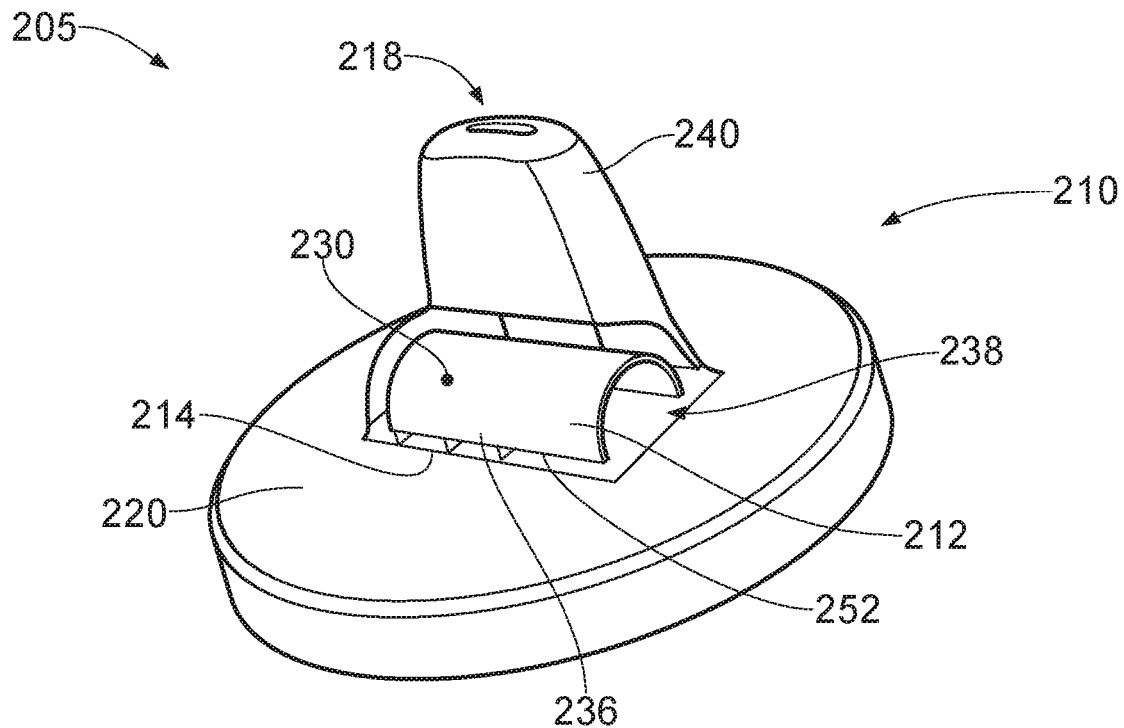
FIG. 17 is a perspective view of a portion of a container 205 comprising a valve 210 according to a third example of the present disclosure, with the valve 210 in a closed configuration.
Figure 18:
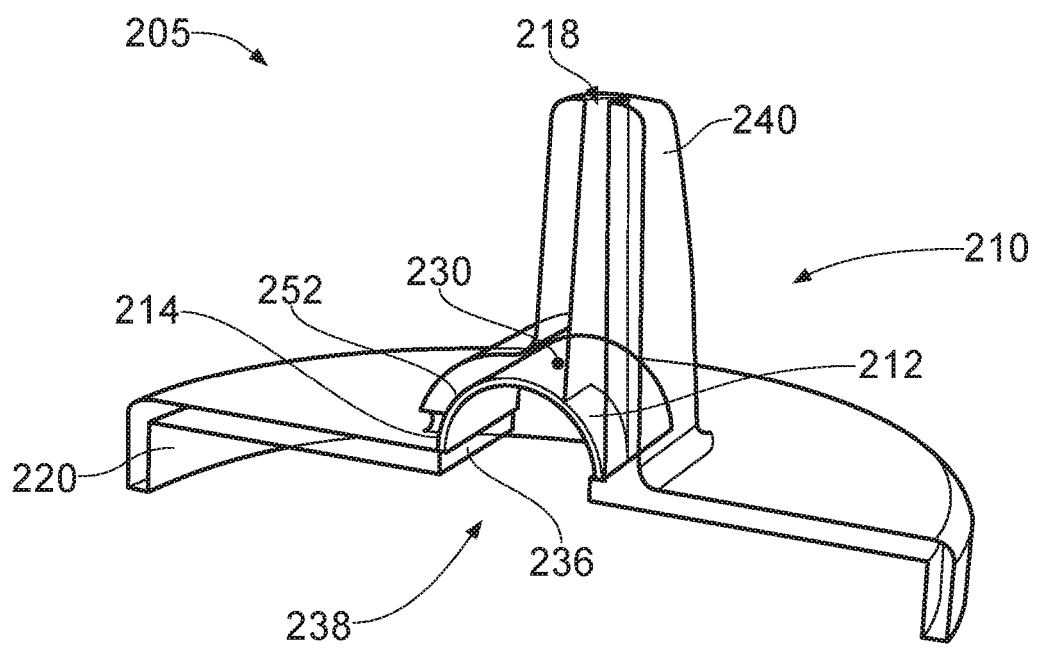
FIG. 18 is a cross-sectional view of the portion of the container 205 of FIG. 17, with the valve 210 in the closed configuration.
Figure 20:
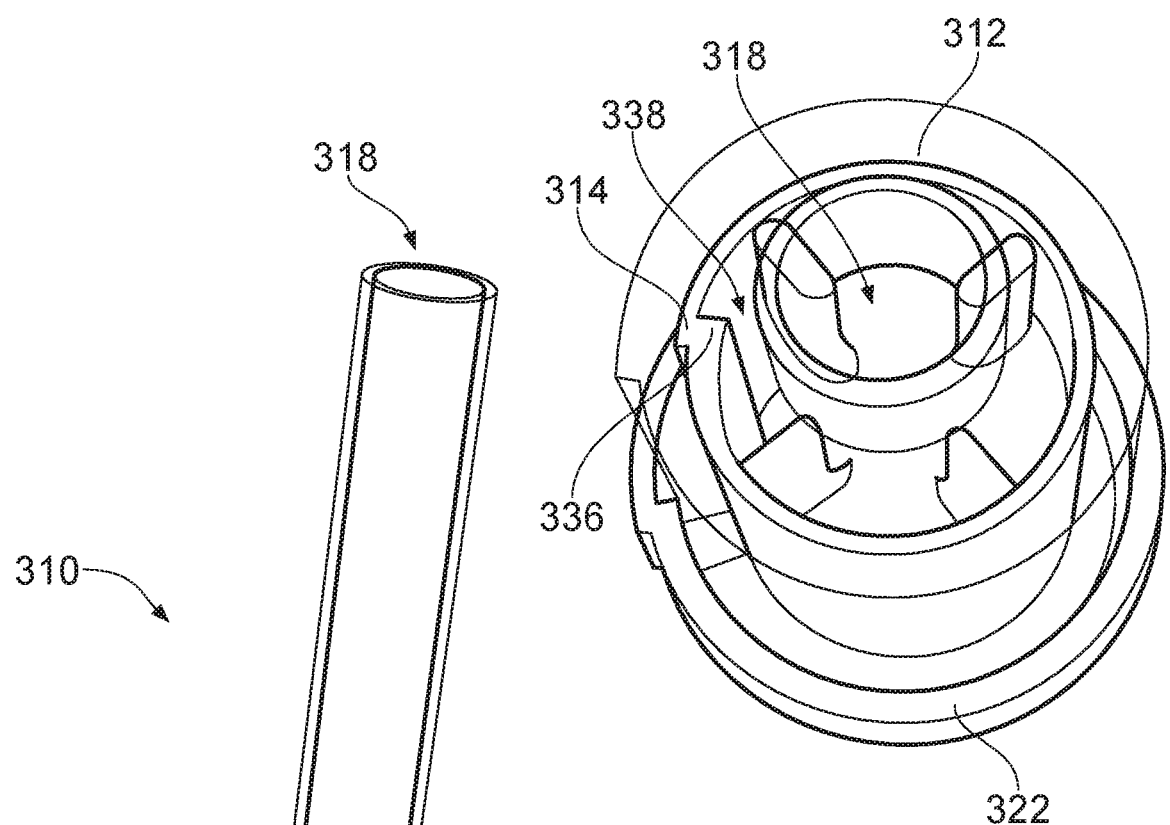
FIG. 20 is a cross-sectional view of the portion of the container 305 of FIG. 19, with the valve 310 illustratively in both the closed and the open configuration.
Figure 19:
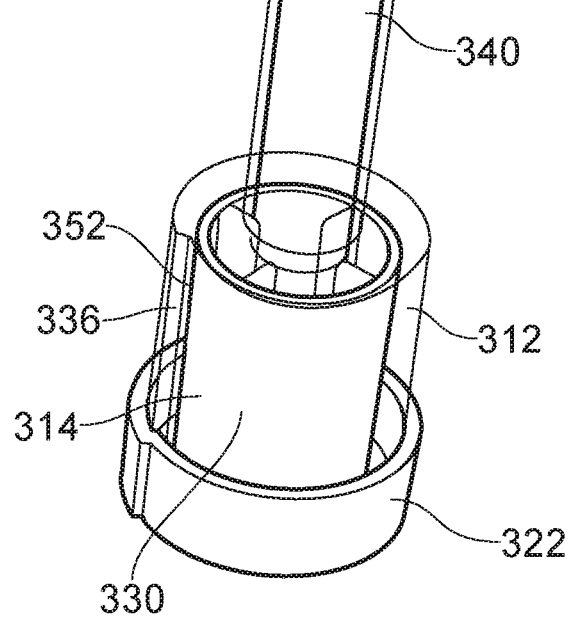
FIG. 19 is a perspective view of a portion of a container 305 comprising a valve 310 according to a fourth example of the present disclosure, with the valve 310 shown illustratively in both a closed and an open configuration.
Figure 21:
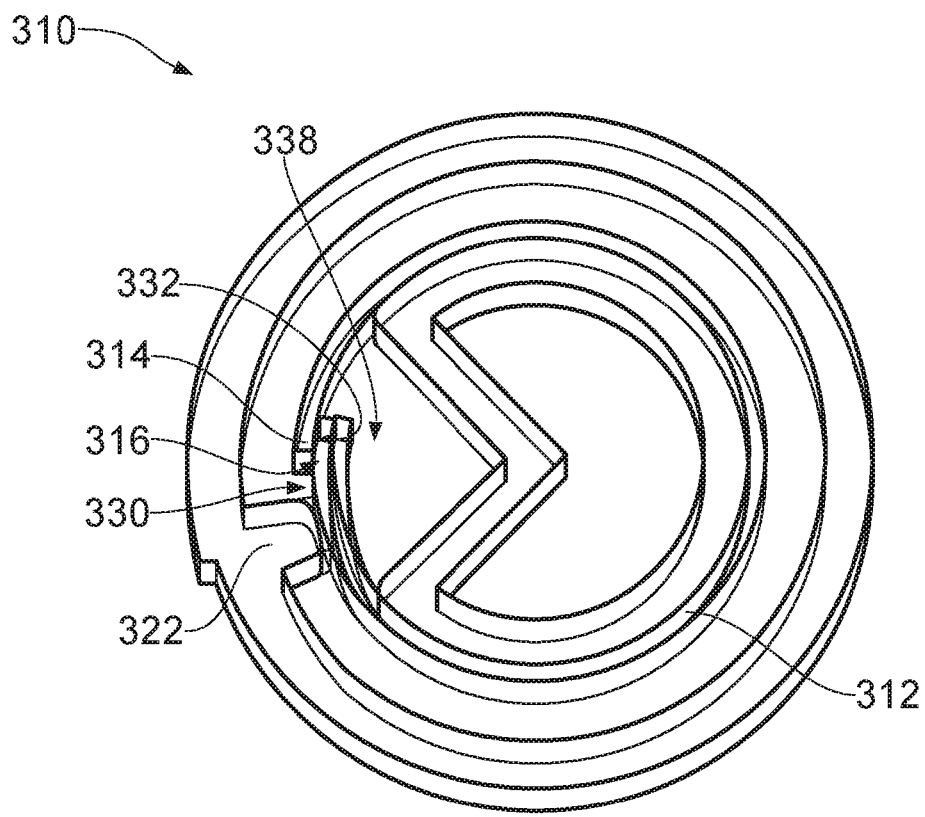
FIGS. 21 and 22 show further cross-sectional views of the container 305 of FIG. 19, with the valve 310 illustratively in both the closed and the open configuration.
Figure 22:
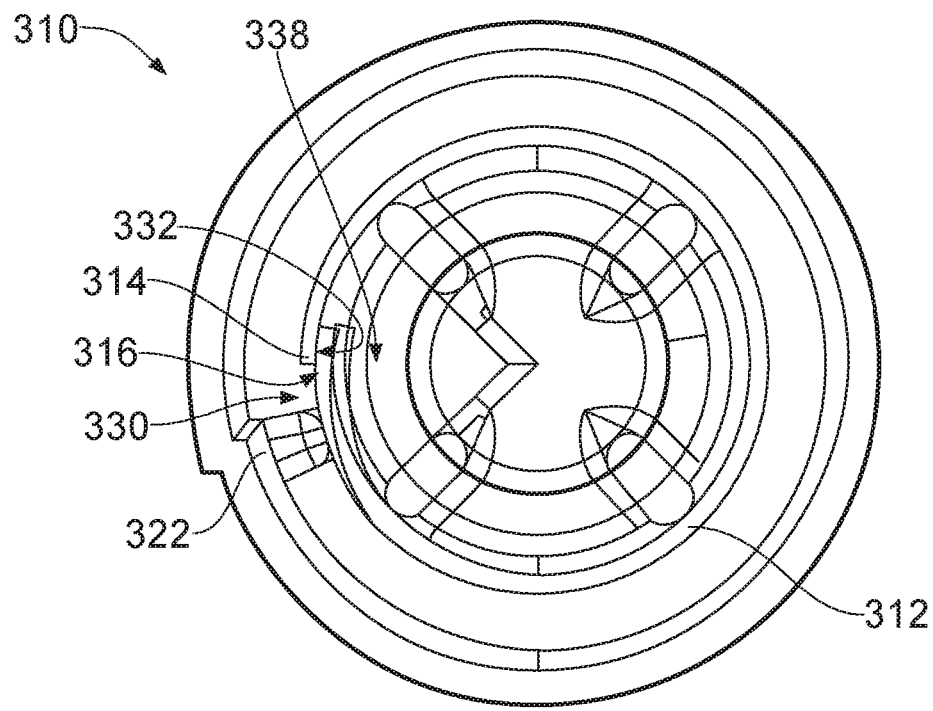

The valve 10 is configured to provide the openable flowpath 16 along or at a periphery or peripheral portion of the valve member 12. The valve 10 is configured to provide a closable sealing portion along or at the periphery or peripheral portion of the valve member 12. The closable sealing portion comprises a sealing interface between a portion of the major face 30 of the valve member 12 and the valve seat 14. In alternative examples, such as shown in FIGS. 17 and 18, the closable sealing portion comprises a sealing interface between a portion of an edge face 236 of the valve member 212 and the valve seat 214.

The valve member 12 is configured to prevent 'healing'. For example, an absence of apertures, slits or openings in the valve member 12 removes or reduces a possibility for the valve member 12 to 'heal', such as during transit and/or storage (e.g. pre-sale in a shop or a warehouse), whereby prior art valve members (not shown) with a slit/s can 'repair' so that the aperture is more difficult for the user to open, at least initially.

Here, the valve member 12 comprises a dynamic valve member 12. The valve member 12 is dynamic so as to be deformable and/or moveable to open the valve 10. The valve 10 comprises a single dynamic valve member 12. The valve member 12 comprises a minimum thickness 34 to provide a minimum stiffness to enable deflection or deviation of the second valve member portion in response to deviation or deflection of the first valve member portion.

The valve member 12 comprises a maximum thickness 34 to provide a minimum deformation in response to enable deflection or deviation of the first valve member portion in response to the activation force. It will be appreciated that the sheet member 12 has a thickness 34 requirement that may place limitations on manufacturing, such as requiring a sheet member material with a thickness 34 within a tolerance window. Here, the deformation comprises bending.

The valve member 12 comprises an impermeable material, such as impermeable to water. Here, the valve member 12 comprises a silicone rubber. The valve member 12 comprises a resilient, food-grade material, such as a FDA-approved material. The valve member 12 comprises a hydrophobic material. Although not shown, in at least some examples the valve member 12 comprises a coating on at least one surface, such as on at least one major face 30, 32. In at least some examples, the bulk material of the valve member 12 comprises an antibacterial agent evenly dispersed therein and/or thereon.

The valve member 12 and the valve seat 14 comprise one or more particular surface properties, such as conducive to forming a seal. For example, the valve member 12 and/or the valve seat 14 comprises a particular surface texture. Here, the valve member 12 and the valve seat 14 comprise a particular surface roughness. The valve member 12 and the valve seat 14 each comprise a surface roughness below a maximum surface roughness, such that the valve member 12 and the valve seat 14 comprise a smooth surface. Here, the maximum surface roughness of the valve member 12 is different from the maximum surface roughness of the valve seat 14. Here, the maximum surface roughness of the valve member 12 and the valve seat 14 is defined by a Ra value selected from one or more of: 10 µm; 5 µm; 2 µm; 1 µm; 0.5 µm; 0.05 µm; and 0.02 µm. In at least some examples, the maximum surface roughness of the valve seat 14 is a Ra value of 0.05 µm; and the maximum surface roughness of the valve member 12 is a Ra value of 1 µm.

In other examples, the valve member 12 and/or the valve seat 14 comprises a maximum roughness depth defined by at least one of: single roughness depth (Rzi), mean roughness depth (Rz) or maximum roughness depth (Rmax); selected from one or more of: 50 µm; 30 µm; 20 µm; 10 µm; 5 µm; 2 µm; and 1 µm.

As shown in FIGS. 1 to 13, the valve seat 14 comprises a greater stiffness than the valve member 12. The valve seat 14 is stiff and the valve member 12 is flexible and resilient compared to the valve seat 14. The valve member 12 is flexible so as to deflect away from at least a portion of the valve seat 14 so as to open the valve 10. The valve 10 comprises a valve recess 38 into which the portion of the valve member 12 deflects to allow opening of the flowpath 16. The valve recess 38 forms part of the flowpath 16, such as a portion of the spout 40 as shown here. The valve recess 38 allows suction of the portion of the valve member 12 towards the outlet 18 from the container 5, such as towards the source of suction or underpressure (e.g. a user's mouth, not shown). The valve 10 is configured to allow only a portion of the valve member 12 to enter the valve recess 38. Allowing only a portion of the valve member 12 to enter the valve recess 38 ensures that the valve member 12 cannot pass out of the outlet 18 or block the flowpath 16 when under sufficient suction. The valve recess 38 includes a portion to which the valve member 12 cannot conform. Here, the valve recess 38 comprises a relief portion 42 defining channels for the flowpath 16, the relief portion 42 being incompatible with the flexibility of the valve member 12 under usable suction. The relief portion 42 comprises angular changes smaller than a minimum bending radius of the valve member 12. Here, the relief portion 42 comprises ribs 44, the ribs 44 providing flow channels 46 adjacent thereto when the valve 10 is in the open configuration, as shown in FIG. 8. The valve 10 is configured to prevent complete passage of the valve member 12 into the valve recess 38 or outlet 18, such as under typical human suction conditions. The valve member 12 comprises properties to prevent complete passage into the valve recess 38 or outlet 18, including a particular thickness 34, stiffness, and dimension/s (e.g. width, length, relative to the valve recess 38). Accordingly the valve member 12 is incapable of blocking the outlet 18 when sufficient (human) suction is applied to the outlet 18. Similarly the valve member 12 properties prevent unintended separation of the valve member 12 from the valve 10 or container 5 such as otherwise may represent a choke hazard.

The valve recess 38 allows the portion of the valve member 12 to be deflected or deformed in or towards the direction of suction, such as towards the outlet 18. Here, the valve member 12 is arranged such that the valve member 12 is perpendicular or substantially perpendicular to the direction of suction, at least in the closed configuration. The valve recess 38 forms part of the spout 40.

Figure 10:
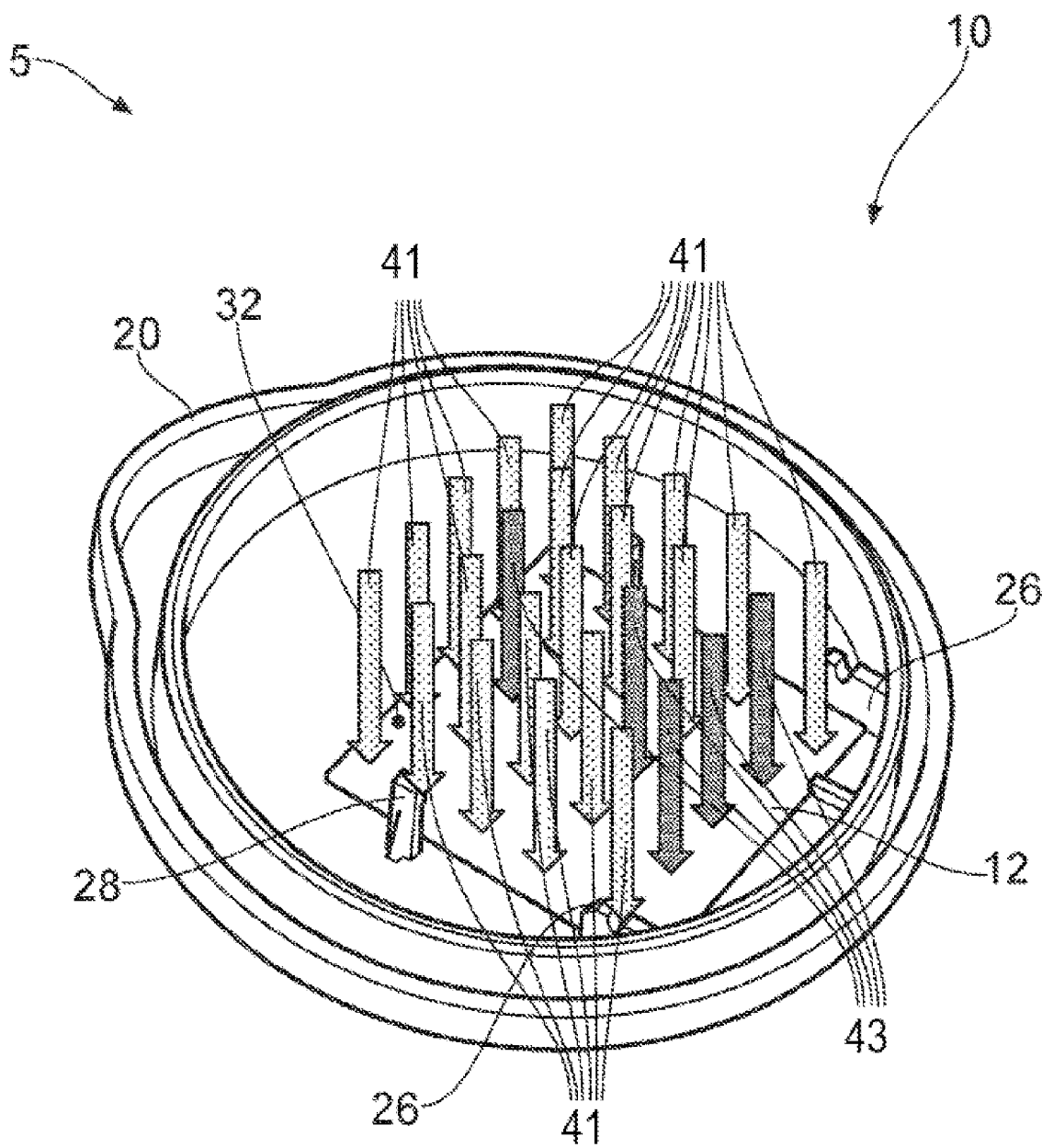
FIG. 10 is an isometric view of the portion of the lid of FIG. 3 with the retainer 22 of the valve 10 omitted, showing a distribution of forces associated with a fluid pressure acting on the valve member 12, with the valve member 12 in the closed configuration.

As shown in FIG. 10, the valve 10 is configured to resist opening of the valve 10 due to an internal pressure within the container 5. For example, the valve 10 is configured to resist opening of the valve 10 due to pressure associated with a depth of fluid within the container 5, such as when the container 5 is inverted or the valve 10 is otherwise subjected to a depth pressure of the fluid contents 21 of the container 5. The valve member 12 comprises a larger surface area, such as of the major face 30, that is engagable with the valve seat 14, at least in the closed configuration, than a surface area of the valve member 12, such as of the major face 32, that is not engageable with the valve seat 14, at least in the closed configuration. Accordingly the valve 10 comprises a relative surface area of the valve member 12 that is engageable with the valve seat 14 than a surface area of the valve member 12 that is not engageable with the valve seat 14. The valve 10 is configured such that a pressure, such as associated with a depth pressure of fluid in the container 5, acts to increase a force of engagement of the valve member 12 against the valve seat 14. The valve 10 is configured to increase the valve seating force more than a force pushing the valve member 12 into the valve recess 38, such as when the valve 10 is subjected to an internal pressure, or primarily an internal pressure. As shown in FIG. 10, more force associated with the pressure represented by dark arrows 43 in FIG. 10 works to press the valve member 12 against the valve seat than force associated with the pressure represented by light arrows 41 in FIG. 10 works to open the valve member 12. The valve 10 comprises a greater area of engagement and contact between the valve seat 14 and the valve member 12 than an area of the valve member 12 that is exposed to suction via the valve recess 38. Providing a greater area of contact and engagement than exposed to the valve recess 38 ensures that a net force associated with an internal container pressure, or primarily an internal pressure (e.g. in the absence of suction through the outlet 18), does not open the valve 10, or does not open the valve 10 substantially. The internal pressure acting against the valve member 12 presses the valve member 12 against the valve seat 14 such that a resistance to movement of the valve member 12 relative to the valve seat 14 is increased, such as by an increased friction between the valve member 12 and the valve seat 14. The internal pressure provides a normal force to increase friction between the valve member 12 and the valve seat 14.

Here, the valve 10 comprises a vent 50. The vent 50 at least assists in balancing a pressure differential across the valve 10, such as when the valve 10 is in an open configuration. The vent 50 is configured to allow air to enter the container 5 as fluid (e.g. liquid) is extracted from the container 5 through the outlet 18. The vent 50 provides a discrete flowpath separate from the outlet flowpath 16. The vent 50 and the outlet 18 are distinct. The vent 50 is located away from the outlet 18 so as to reduce likelihood of the vent 50 being covered by a user's mouth. The vent 50 defines an air inlet into the container 5. The vent 50 is selectively closable by the valve 10. The vent 50 is selectively openable and closable by the valve 10 corresponding to the opening and closing of the outlet flowpath 16 by the valve 10. The valve member 12 is configured to seal both the outlet flowpath 16 and the vent 50, when in the closed configuration. The valve member 12 is configured to open both the vent 50 and the outlet flowpath 16 when reconfigured from the closed to the open configuration. The valve 10 is configured to open both the outlet flowpath 16 and the vent 50 by the user's suction through the outlet 18. The valve 10 is configured to open both the vent 50 and the outlet flowpath 16 by the application of only suction by the user through the outlet 18. In at least some examples (not shown), the movement of the valve member 12, such as towards the outlet 18 or valve recess 38, move the valve member 12 so as to open the valve 10. In such examples, the movement of the valve member 12 towards the source of suction, may slide the valve member 12 to reveal a venthole of the vent. In such examples, the venthole may comprise a two-way vent 50, when open. Here, the venthole effectively comprises a one-way vent 50 when open, allowing the passage of fluid in only a single direction (e.g. into the container 5). The valve 10 is configured to seal the vent 50 and the outlet 18 with the single valve member 12. Here, the vent 50 is openable under a sufficient pressure differential across the vent 50. For example, when an external pressure, such as atmospheric pressure is sufficiently greater than an internal pressure (in the container 5), then the pressure differential causes the valve member 12 to deflect or deform at the vent 50 to open the vent 50 allow the passage of fluid (e.g. air) into the container 5. Accordingly, when an underpressure or vacuum is created in the container 5, such as by a user's suction, then the vent 50 is opened.

The valve member 12 is configured to allow air inflow into the container 5 whilst the valve member 12 is activated by suction from the user. In other examples, the valve member 12 is configured to allow air inflow into the container 5 only whilst the valve member 12 is activated by suction from the user. Here, the valve member 12 is configured to allow air inflow into the container 5 through an air flowpath 16 separate from the outflow flowpath 16, through the vent 50. The valve member 12 is configured to deflect or deform so as to provide an air inflow flowpath from a separate air inflow opening, via the vent 50.

Figure 11:
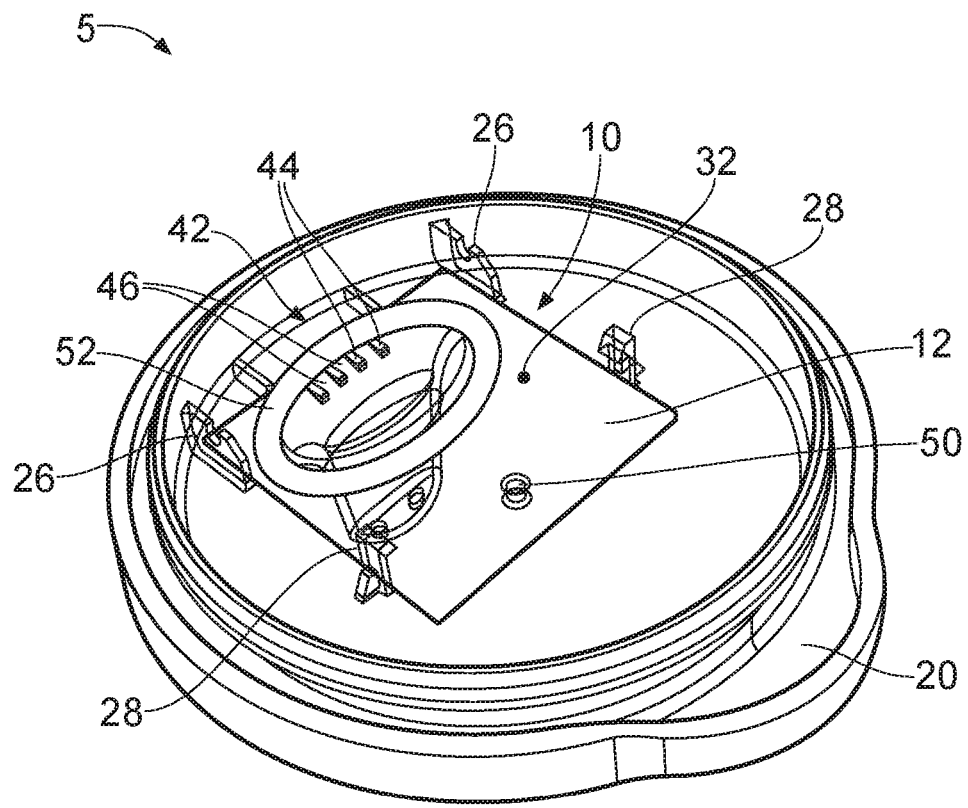
FIG. 11 is an isometric view of the portion of the lid of FIG. 3 with the retainer 22 of the valve 10 omitted, showing schematically a circumferential seal with the valve 10 in the closed configuration.
Figure 12:
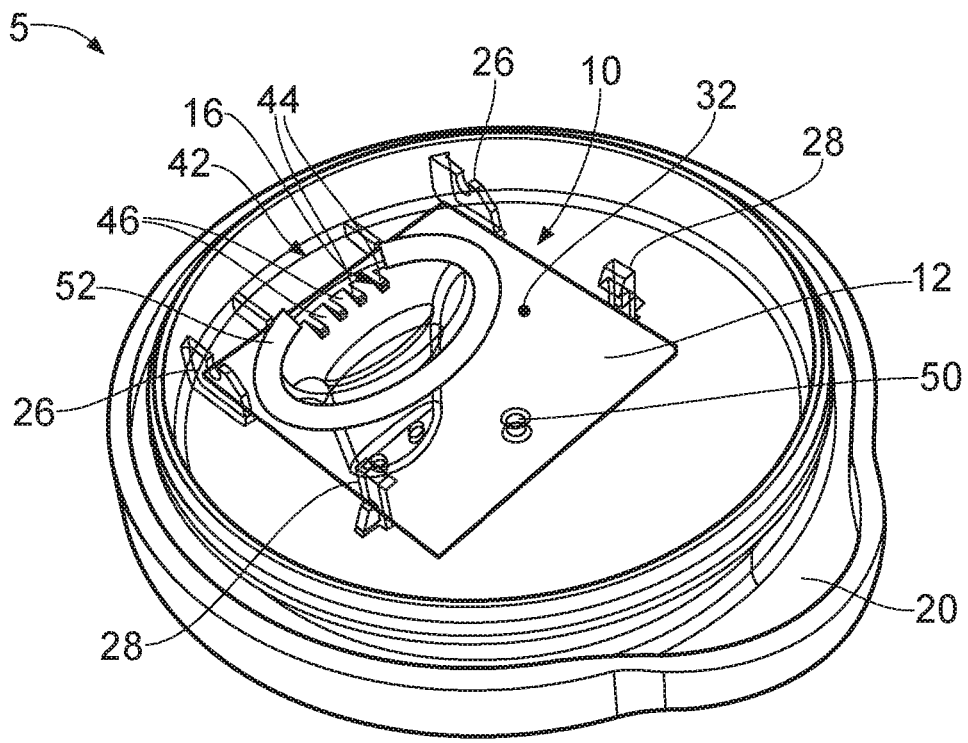
FIG. 12 is an isometric view of the portion of the lid of FIG. 3 with the retainer 22 of the valve 10 omitted, showing schematically the circumferential seal partially broken with the valve 10 in the open configuration.

The valve member 12 is planar. Here, the valve member 12 is planar at least when in a rest state, such as in a disassembled configuration, such as shown in FIG. 2. In the examples shown in FIGS. 1 to 13 and FIGS. 14 to 16, the valve member 12, 112 is also planar when in the closed configuration, assembled in the valve 10, 110, such as shown in FIGS. 3, 4 and 15. As schematically illustrated in FIG. 11, the valve member 12 defines a seal 52 in a single plane, when in the closed configuration. The valve member 12 defines a circumferential seal in the single plane around the flowpath 16, when in the closed configuration. As shown in FIG. 12, the seal 52 is broken or opened, by breaking the seal 52 at at least a portion of the circumferential seal 52. As shown in FIG. 12, the seal 52 here is opened by breaking the seal 52 at only the portion of the circumferential seal 52; and not the entire seal 52.

Here, the valve 10 comprises a pressure-responsive valve 10. The valve 10 is selectively openable in response to a pressure differential across the valve member 12, such as between pressure within the container 5 and pressure external to the container 5. The valve 10 is only openable (or at least more easily openable—such as with a lower or feasible pressure differential), in one direction. The valve 10 comprises a suction-operated demand valve 10. Here, a cross-sectional area of the flowpath 16 increases with suction, such as at intermediate positions (not shown) between the closed configuration of FIG. 8 and FIG. 9. The cross-sectional area of the flowpath 16 defined by the valve member 12 increases proportionally with suction. Here, increasing suction cause increased movement of the at least a portion of the valve member 12 away from the valve seat 14. The stiffness of the valve member 12 causes the portion 60 of the valve member 12 to be levered away from the valve seat by pivoting about the relief portion 42 as another portion 62 of the valve member 12 is sucked into the valve recess 38. The cross-sectional area of the flowpath 16 associated with the opening by the movement of the at least a portion 60 of the valve member 12 is variable. The cross-sectional area of the flowpath 16 is variable between zero or substantially zero (closed) when no suction is applied (e.g. subject to atmospheric pressure), as shown in FIG. 8, and a maximum cross-sectional area (fully open) when subjected to a human-induced suction or underpressure, such as is associated with a baby, infant, child or adult sucking, as appropriate, as shown in FIG. 9.

It will be appreciated that where the valve 10 is reconfigurable from the closed configuration of FIG. 8 to the open configuration of FIG. 9, the valve 10 is also reconfigurable from the open configuration of FIG. 9 to the closed configuration of FIG. 8, by a reduction or cessation in suction. The flowpath 16 is selectively closable by a reduction in suction. The flowpath 16 is automatically closable in response to a reduction in or cessation of user suction. The flowpath 16 is automatically closable by the resilient valve member 12. The valve member 12 is biased towards the closed configuration, the valve member 12 comprising an internal resilience to bias the valve member 12 (associated with an elastic stiffness of the valve member 12). For example, here the valve member 12 comprises a resilient material, silicone rubber, that is deformed or deflected towards the open configuration of FIG. 9 by suction and reverts to the closed configuration of FIG. 8 by a resumption of its natural form in a rest position in the valve 10.

The valve 10 comprises a leak-proof or a leak-resistant valve 10, providing a selective seal 52 for selectively opening and closing the container 5, such as to selectively allow the flow of fluid into and/or out of the container 5. Here, the valve 10 provides a low-leak seal, such as allowing a slow or small leakage of a portion of the contents 21 when in a sealing configuration (into and/or out of the container 5 as applicable). The low leakage may only be encountered when a sufficient pressure is exerted on the seal 52 (e.g. by thermally-induced pressure within the container) or when the container 5 is dynamically moved, such as to mechanically dislodge the valve member 12 form the valve seat 14 (e.g. if the container 5 is dropped). Providing a low-leak seal 52 may assist in balancing a pressure differential across the valve 10, such as when the valve 10 is in a closed or sealing configuration. Providing a low-leak seal provides a suitable seal for many uses, whilst potentially allowing manufacturing and/or hygiene and/or cleaning and/or cost improvements, such as compared to a fully sealing no-leak valve 10. In other examples, low-leakage may be encountered by capillary action between the valve member 12 and the valve seat 14, or by passage along a restricted (small) flowpath 16 in the closed configuration.

Here, the container 5 comprises a closure, in the form of the lid 20. The valve 10 is associated with the closure, here being mounted in or to the lid 20. The lid 20 here defines the valve seat 14, such that the openable flowpath 16 is defined between the valve member 12 and the lid 20. Here the lid 20 comprises a fluid passage in the form of the spout 40, with the valve recess 38 extending into the fluid passage. It will be appreciated that the lid 20 is sealingly mountable to a body 64 of the container 5, separable from the body 64 to allow access to the interior of the container 5 such as to fill the container 5 with liquid and/or for cleaning, inspection, etc.

Figure 13:
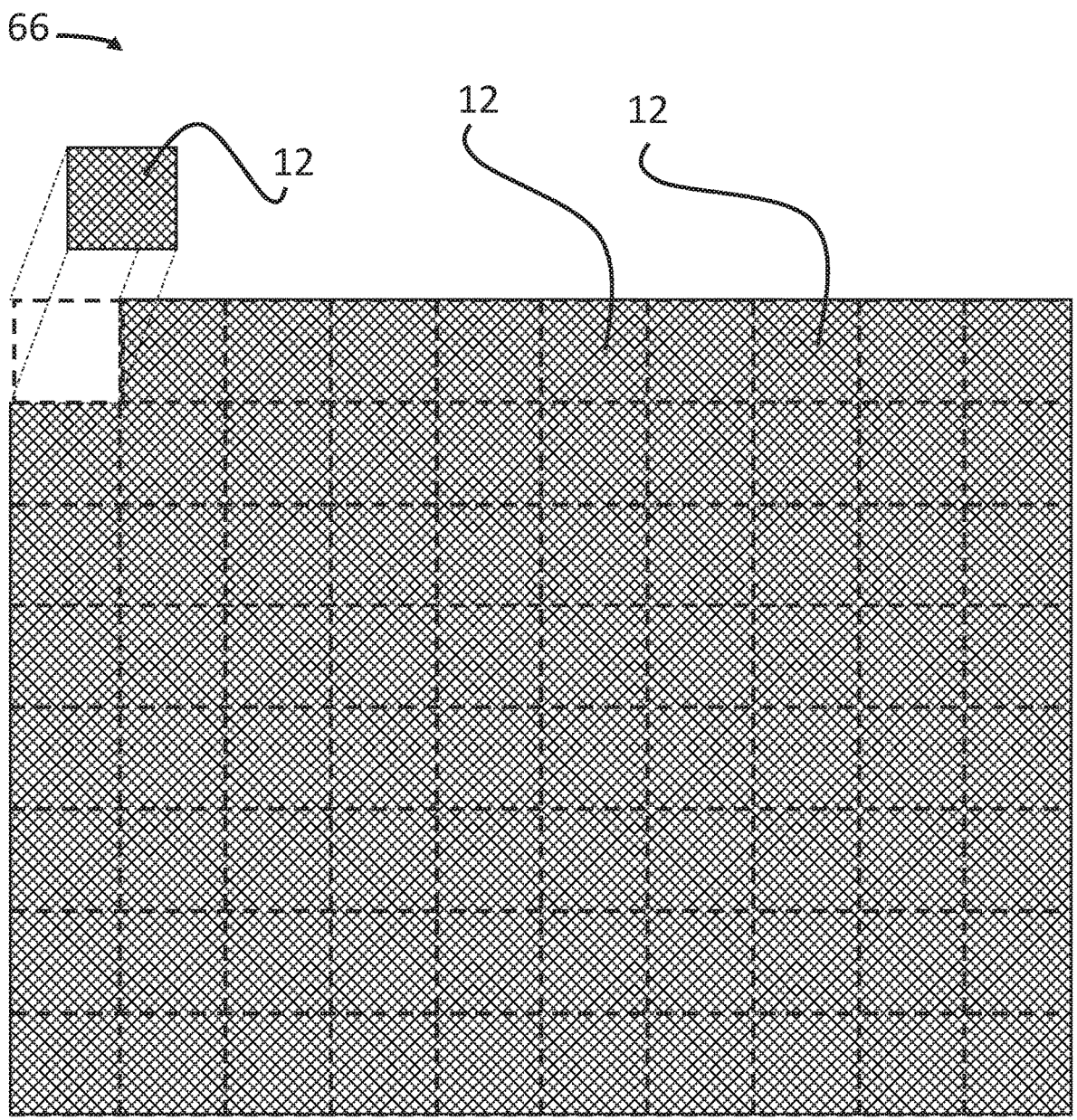
FIG. 13 is a schematic view of a sheet material showing a step in a manufacture of the valve member 12 of the valve 10 of FIG. 1.

FIG. 13 shows a schematic view of a sheet material 66 showing a step in a manufacture of the valve member 12 of the valve 10. The method of manufacture here comprises fabricating the valve member 12 from the sheet material by detaching a portion from a remainder of the sheet material 12, such as by one or more of: cutting; stamping; laser-cutting; hot-stamping. As shown here, the method comprises detaching the portion from the sheet material 66 as a whole continuous portion, providing a single, integral sheet for each valve 10, such that each valve 10 only comprises one sheet of valve material constituting the valve member 12.

The method comprises forming the valve member 12 with a continuous, unbroken surface formed within an outline periphery, the outline periphery defined by the border of extraction from the remainder of the sheet material 66. The method comprises forming the valve member 12 without any internal indentations, apertures, slits, or the like in the valve member 12, within the outline periphery. The method comprises assembling the valve member 12 in the valve 10 without any internal indentations, apertures, slits, or the like in the valve member 12 (as can be seen in FIGS. 2 and 3). Thus, as shown here, the valve member 12 is formed by merely cutting or stamping a simple two-dimensional shape from the sheet material 66. As shown in FIGS. 1 to 13, the two-dimensional shape here comprises a tessellating shape, which is similar or identical for a plurality of valve members 12, here as a rectangle. In this example, each valve member 12 formed from the sheet material comprises a rectangle of similar dimensions.

In at least some examples, the valve 12 and container 5, including the lid 20, are fabricated in a factory such as using moulding, extrusion or other conventional fabrication techniques. In other examples, one or more of the components of the valve 12 and/or container 5 is formed by additive or 3D printing. The method comprises transferring manufacturing instructions, such as to or from a computer (e.g. vie internet, e-mail, file transfer, web or the like) and printing at least some of the components of the valve 10 and/or the container 5 according to a CAD file. The valve member 12 is supplied in sheet format, such as for assembly into the 3D printed valve 10 (and optionally 3D printed container 5). The valve member 12 is supplied in a final-use configuration.

In at least some examples, the container 5 is configured to inhibit or mitigate against unhygiene, such as bacterial growth and/or dirt/debris accumulation/s. The container 5 is configured for: handwashing; dishwasher washing; disassembly; reassembly; valve 10 access; valve member 12 removal; and/or valve member 12 replacement.

In at least some examples, the container 5 comprises a re-usable container 5, such as a reusable reusable sippy cup. In other examples, the container 5 comprises a disposable container 5, such as a single-use container 5. Here, the container 5 is microwaveable and dishwasher-safe. The container 5 comprises a cleaning configuration. For example, the container 5 is reconfigurable to provide access to the valve 10, such as by opening or removing the lid 20. The cleaning configuration provides access to an inside of the container 5. The cleaning configuration allows at least partial removal or separation of one or more of the components of the valve 10. For example, the valve member 12 here is fully removable from the valve seat 14 (by pivoting the retainer 22 open).

Here, all parts or components of the valve 10 and container 5 comprise an appropriate healthy and hygienic material. For example, at least some example containers 5 comprising the valve 10 consist of only food-grade materials in accordance with food safety under at least EU and/or US FDA regulations. At least some example drinking vessels comprise materials free from one or more of: BPA; endocrine disrupter chemicals; chemicals with hormone-like effects; phthalates; leachable chemicals.

Figure 14:
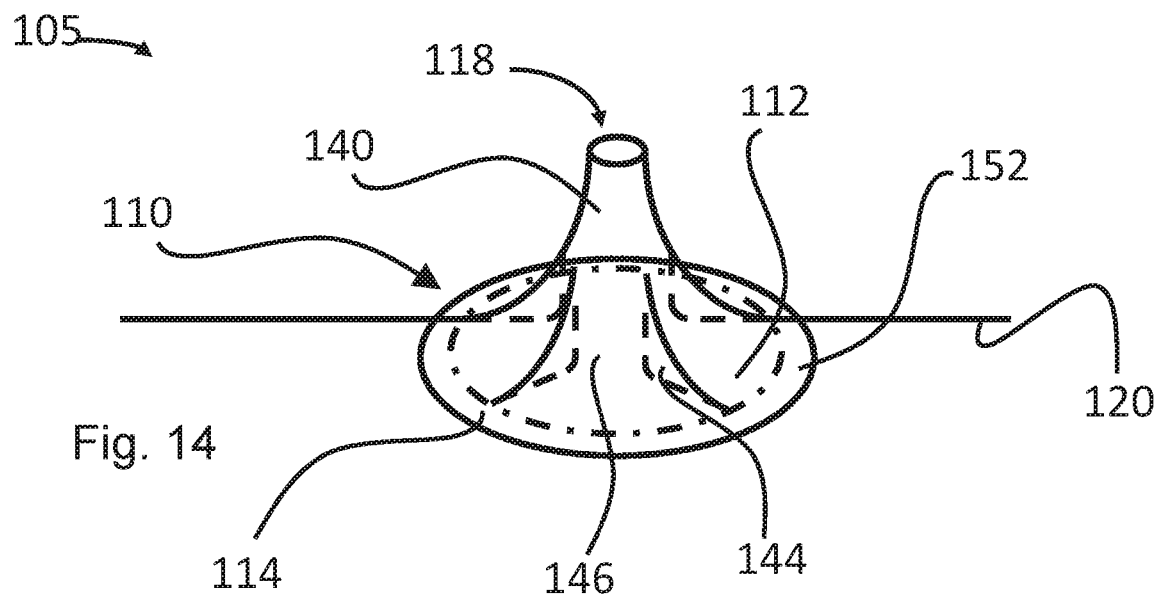
FIG. 14 is a schematic view of a portion of a container 105 comprising a valve 110 according to a second example of the present disclosure.
Figure 15:
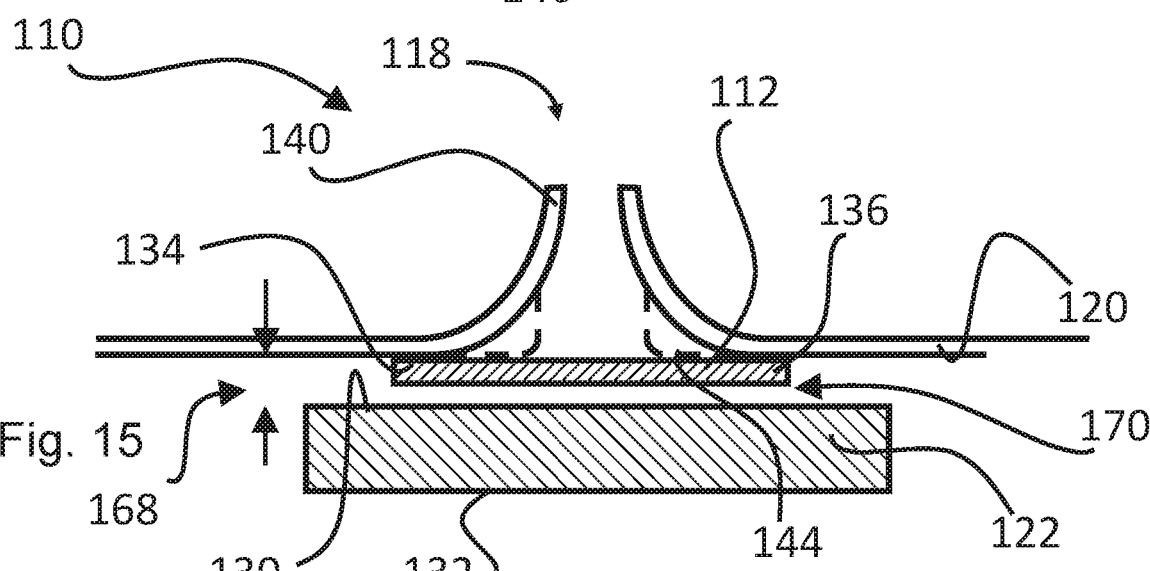
FIG. 15 is a schematic cross-sectional view of the portion of the container 105 of FIG. 14, with the valve 110 in a closed configuration.
Figure 16:
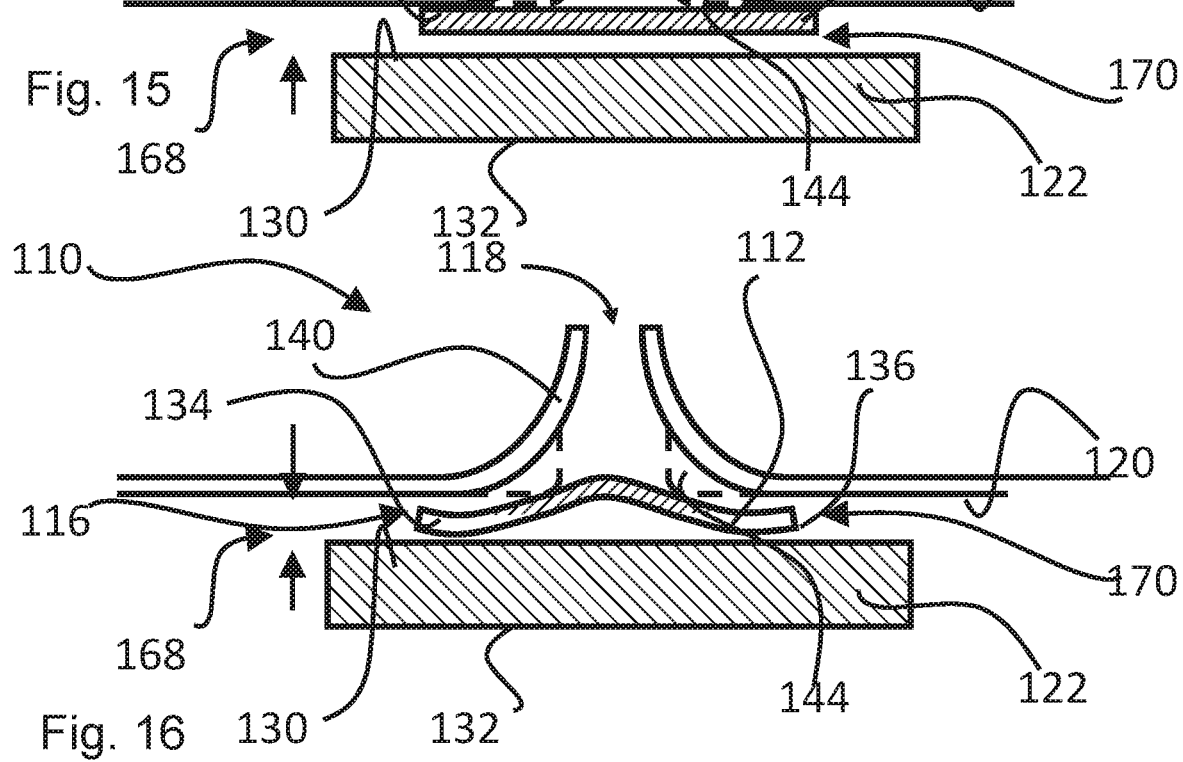
FIG. 16 is a schematic cross-sectional view of the portion of the container 105 of FIG. 14, with the valve 110 in an open configuration.

Referring now to FIGS. 14, 15 and 16, there is shown a portion of a container 105 comprising a valve 110 according to a second example of the present disclosure. The portion of the container 105 and the valve 110 shown in FIGS. 14, 15 and 16 is generally similar to that shown in FIGS. 1 to 13, with similar features denoted by similar references numerals, incremented by 100. Accordingly, the valve comprises a valve member 112 and a valve seat 114. For brevity, a description of not all detailed features is duplicated for this second example.

The valve member 112 shown in FIGS. 14, 15 and 16 is generally similar to those shown in FIGS. 1 to 13, although the valve member 112 here is circular rather than rectangular. As shown clearly in FIGS. 15 and 16, the valve 110 comprises a retainer 122 for retaining the valve member 112 relative to the valve seat 114. The retainer 122 is located or locatable at an interior of the container 105, such as shown here on an interior of the lid 120 of the container 105. The retainer 122 assists in defining a compartment or chamber for housing the valve member 112. The retainer 122 allows the valve member 112 to move within the compartment or chamber. The retainer 122 is configured to allow at least a portion of the valve member 112 to move along at least a portion of the retainer 122 and/or the valve seat 114. Here, the retainer 122 is configured not to press the valve member 112, or at least not all of the valve member 112, against the valve seat 114. In the example of FIGS. 14 to 16, at least a portion of the retainer 122 is spaced from the valve seat 114 so as to define a greater dimension of the chamber or compartment than a corresponding dimension of the valve member 112. For example, the retainer 122 is arranged relative to the valve seat 114 to define a height or thickness 168 of the compartment or chamber greater than a corresponding height or thickness 134 of the valve member 112. The valve 110 comprises a gap 170 between the valve member 112 and the retainer 122 in at least some configurations. The valve member 112 is sandwiched between the valve seat 114 and the retainer 122, the sandwich also including the gap 170 between the valve seat 114 and the retainer 122. Here, the gap is located between the valve member 112 and the retainer 122 in at least the closed configuration of FIG. 15. Here, a distribution of a portion of the gap 170 is variable between the closed and the open configurations. Here, a flowpath portion of the gap 170 varies from being between entirely or primarily between the valve member 112 and the retainer 122 in the closed configuration as shown in FIG. 15; and the gap 170 being entirely or primarily between the valve member 112 and the valve seat 114 in the open configuration, as shown in FIG. 16. Accordingly, the gap 170 provides for a flowpath 116 in the open configuration, when viewed in cross-section, such as in FIG. 16. As shown in FIGS. 14, 15 and 16, it will be appreciated that the valve 110 here provides a circumferential seal 152 that is openable around its entire circumference.

Here, the valve 110 is symmetrical so as to allow unilaterally a flowpath 116 to the outlet 118, such as independently of an orientation or direction of the valve 110 and/or container 105. Liquid can enter the flowpath 116 from any direction (e.g. any direction horizontal to the valve 110 as shown in FIGS. 15 and 16). Accordingly, the valve 105 is well-suited for containers with lids of small diameters (e.g. relative to a user's mouth) so that the user does not need to orient the container (e.g. by rotation about a longitudinal axis of the container). In at least some examples, the lid is of smaller diameter that that 120 shown in FIGS. 14, 15 and 16, such as for sports bottle caps. Accordingly the valve is well-suited for a low tilt angle and/or maximising emptying of contents, irrespective of orientation of the container about its longitudinal axis. The retainer 122 shown here is also round. Although not illustrated, it will be appreciated that the retainer 122 can be retained via a screwthread in its circumferential perimeter, engaging a wall (also not shown) projecting downwards from the lid 120. A series of openings in the wall around the circumference provide access to the flowpaths 116. In other examples, such as a disposable sports bottle, the retainer is welded to the lid.

Referring now to FIGS. 17 and 18, there is shown a portion of a container 205 comprising a valve 210 according to a third example of the present disclosure. The portion of the container 205 and the valve 210 shown in FIGS. 17 and 18 is generally similar to that shown in FIGS. 14 to 16, with similar features denoted by similar references numerals, incremented by 100. Accordingly, the valve comprises a valve member 212 and a valve seat 214. For brevity, a description of not all detailed features is duplicated for this third example.

Here, the valve 210 is configured to provide the openable flowpath 216 along or at a periphery or peripheral portion of the valve member 212, such as the edge or edge face 236 of the valve member 212. The valve 210 is configured to provide a closable sealing portion along or at the periphery or peripheral portion of the valve member 212, such as the edge or edge face 236 of the valve member 212. Here, the closable sealing portion comprises a sealing interface between a portion of an edge face 236 of the valve member 212 and the valve seat 214.

Although not entirely visible, the edge portion 236 of the valve member 212 passes at least partially into the valve recess 238 in the open configuration to provide a portion of the flowpath 216, the portion of the flowpath 216 being between the valve seat 214 and the edge portion 236 of the valve member 212. Accordingly, reconfiguring the valve 210 to the open configuration comprises the edge portion 236 passing at least partially into the valve recess 238. The edge portion 236 is an external or outer edge portion, such as defining an outer periphery of the valve member 212.

The valve member 212 is planar in a rest state, such as when disassembled (not shown). However, here, the valve member 212 is non-planar when in the closed configuration, assembled in the valve 210, as shown in FIGS. 17 and 18. The valve member 212 is curled or curved in one single direction when assembled in the valve 210, in the closed configuration. Curling the valve member 212 assist in providing the valve member 212 with a bias or pretension in a particular direction, here biasing the valve member 212 towards the closed configuration. Here, the valve member 212 defines a cross-section comprising of a smooth curve, in the form of an arc, the cross-section being the same along the entire length of an axis perpendicular to the cross-section, when in the closed configuration. Indeed the valve member 212 defines a portion of a (hollow) a cylinder, when assembled in the valve 210 in the closed configuration. The valve 210 is reconfigurable from the closed configuration to the open configuration by varying a radius of at least a portion of the cross-sectional curve. Here, the radius of the valve member 212 decreases at at least a portion along the axis perpendicular to the cross-section to open the valve 210.

In the closed configuration the valve member 212 defines the portion of the hollow cylinder, with the flowpath 216 being established in the open configuration between an interior and an exterior of the cylinder volume, transversely to a longitudinal axis of the cylinder. At least a portion of the curled or curved valve member 212 or curls further from the closed to the open configuration to open the flowpath 216 in at least a portion of the seal 252 along a longitudinal length of the cylinder. The longitudinal axis of the cylinder is parallel to or the same as the axis transverse to the cross-section of the valve member 212. Here, the cylinder is perpendicular to the spout 240 of the lid 220. Referring now to FIGS. 19, 20, 21 and 22, there is shown a portion of a container 305 comprising a valve 310 according to a fourth example of the present disclosure. The portion of the container 305 and the valve 310 shown in FIGS. 19, 20, 21 and 22 is generally similar to that shown in FIGS. 17 and 18, with similar features denoted by similar references numerals, incremented by 100. Accordingly, the valve comprises a valve member 312 and a valve seat 314. For brevity, a description of not all detailed features is duplicated for this fourth example.

Here the container (not shown) comprises a sports bottle, with the valve member 312 being associated with a straw 340. Here, the valve member 312 is mounted around the straw 340, towards an end portion of the straw 340. In other examples, the valve member 12 is mounted at or in an intermediate portion of the straw 340.

As shown here, the valve seat 314 comprises a further portion of the valve member 312. As shown illustratively in FIGS. 19 through 22, the valve member 312 is deformed in the closed configuration so as to be self-sealing, a first portion of the valve member 312 sealingly seating against a second portion of the valve member 312. As shown here, the valve member 312 is rolled or curled such that a portion of the first major surface 330 of the valve member 312 seats against a portion of the second major surface 332 of the valve member 312. The at least a portion of the valve member 312 that moves to selectively open and close the flowpath 316 seats against that further portion of the valve member 312 in the closed configuration.

Again, the valve member 312 is planar in a rest state, such as when disassembled (not shown). Clearly, here, the valve member 312 is non-planar when in the closed configuration, assembled in the valve 310, as shown in FIGS. 19 to 22. The valve member 312 is curled or curved in one single direction when assembled in the valve 310, in the closed configuration. Curling the valve member 312 assists in providing the valve member 312 with a bias or pretension in a particular direction, here biasing the valve member 312 towards the closed configuration. Here, the valve member 312 defines a cross-section comprising of a smooth curve, in the form of a circle or spiral, the cross-section being the same along the entire length of an axis perpendicular to the cross-section, when in the closed configuration. Indeed the valve member 312 defines a (hollow) cylinder, when assembled in the valve 310 in the closed configuration. The valve 310 is reconfigurable from the closed configuration to the open configuration by varying a radius of at least a portion of the cross-sectional curve. Here, the radius of the valve member 312 decreases at at least a portion along the axis perpendicular to the cross-section to open the valve 310. In the closed configuration the valve member 312 defines the hollow cylinder, with the flowpath 316 being established in the open configuration between an interior and an exterior of the cylinder volume, transversely to a longitudinal axis of the cylinder. At least a portion of the curled or curved valve member 312 or curls further from the closed to the open configuration to open the flowpath 316 in at least a portion of the seal 352 along a longitudinal length of the cylinder. The longitudinal axis of the cylinder is parallel to or the same as the axis transverse to the cross-section of the valve member 312. Here, the cylinder is parallel to the straw 340.

The valve 310 here is configured to allow air inflow into the container 5, such as to balance pressure for liquid outflow from the container. The air inflow is along substantially the same flowpath as the liquid outflow in an opposite direction to the liquid outflow. In at least some examples, the container (not shown) provides an additional or alternative air inflow flowpath. Here, the air inflow is simultaneous with the liquid outflow. For example, air may flow or bubble into the container whilst liquid is flowing out of the container. The liquid outflow may generate an underpressure within the container, such that the container draws in air inflow when the suction at the outlet 318 of the container drops or ceases (e.g. when the user stops sucking).

Referring now to FIGS. 23 to 29, there is shown a container 405 comprising a valve 410 according to a further example of the present disclosure. The portion of the container 405 and the valve 410 shown in FIGS. 23 to 29 is generally similar to that shown in FIGS. 1 to 12, with similar features denoted by similar references numerals, incremented by 400. Accordingly, the valve comprises a valve member 412 and a valve seat 414. For brevity, a description of not all detailed features is duplicated for this fifth example.

Figure 23:
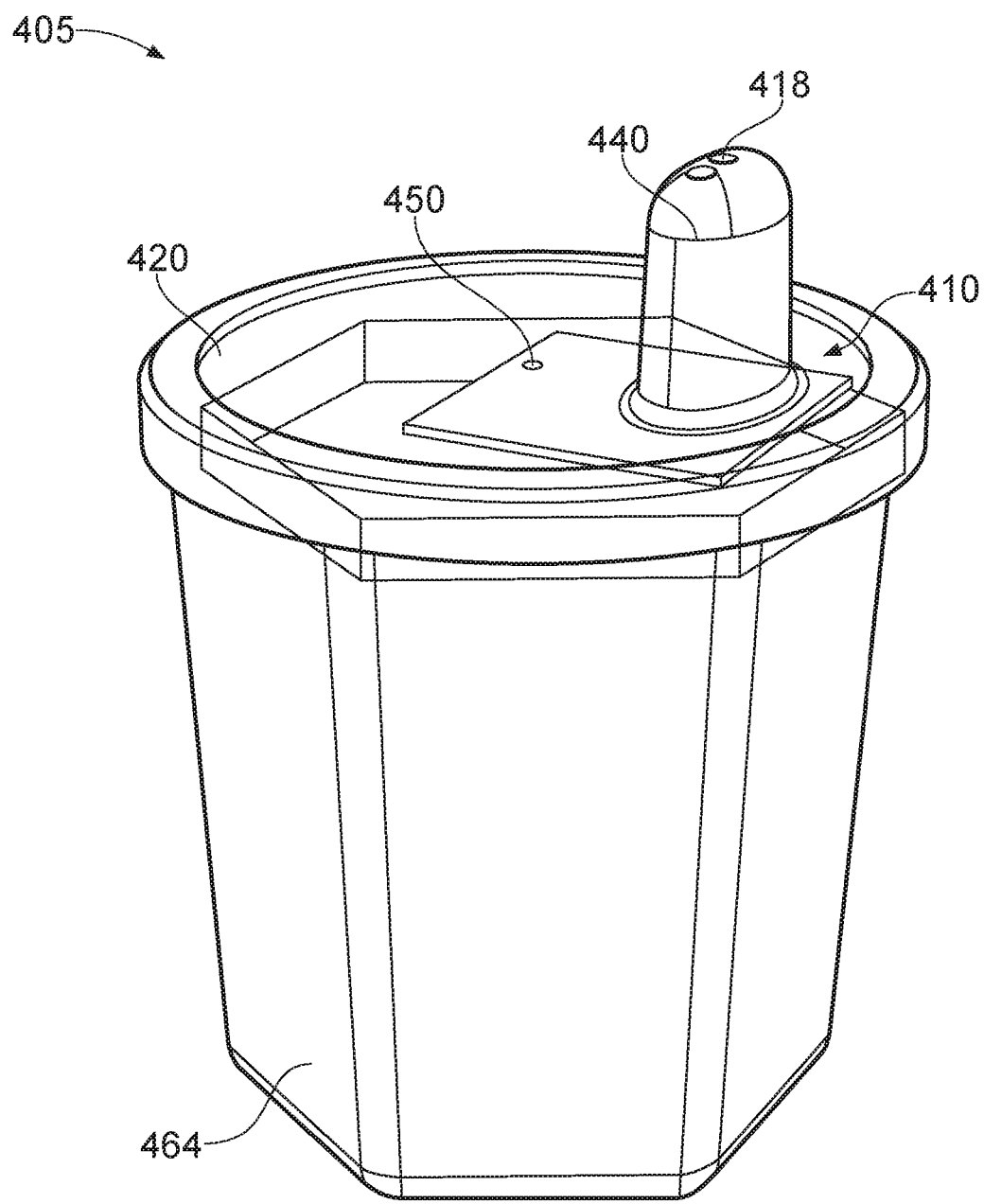
FIG. 23 is a perspective view of a container 405 comprising a valve 410 according to another example of the present disclosure, in a first configuration.
Figure 24:
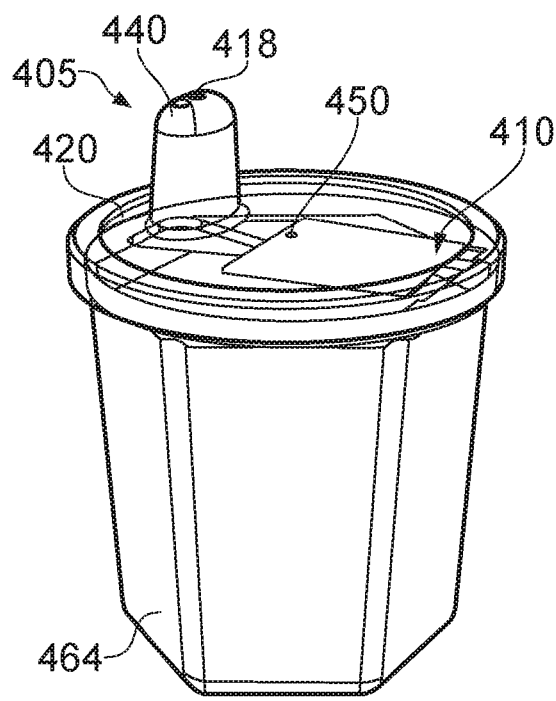
FIGS. 24, 25, 26, 27 and 28 are FIG. 24 are perspective views of the container 405 of FIG. 23, in other respective configurations.
Figure 25:
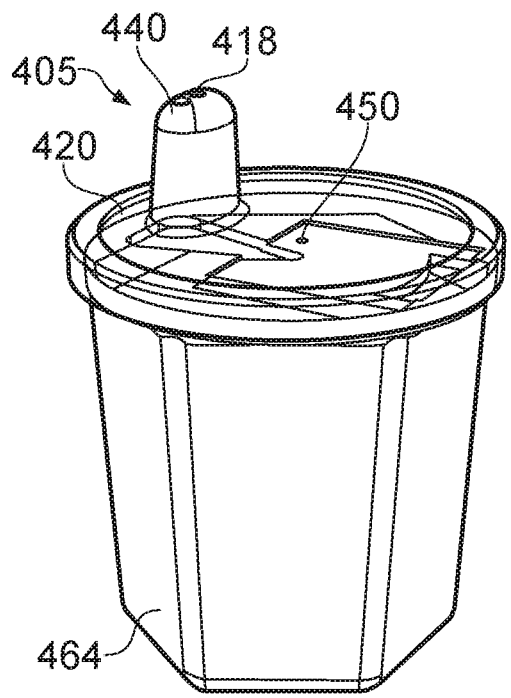
Figure 30:
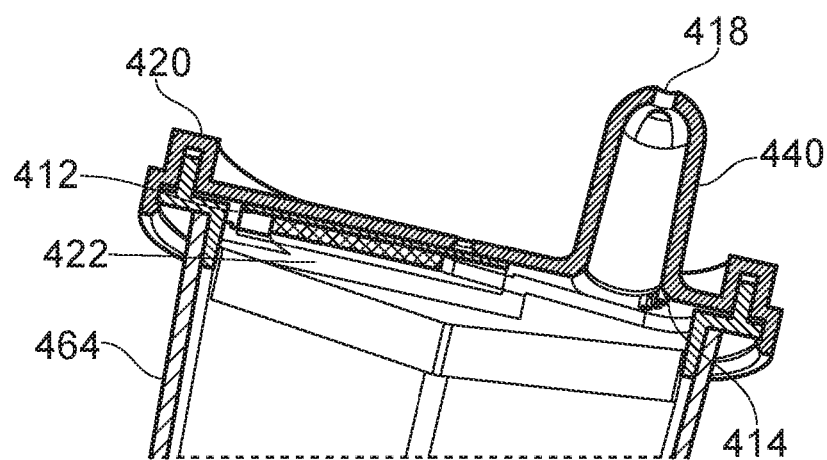
FIGS. 30, 31 and 32 are cross-sectional views of a portion of the container of 405 of FIG. 23 showing different in-use configurations.
Figure 31:
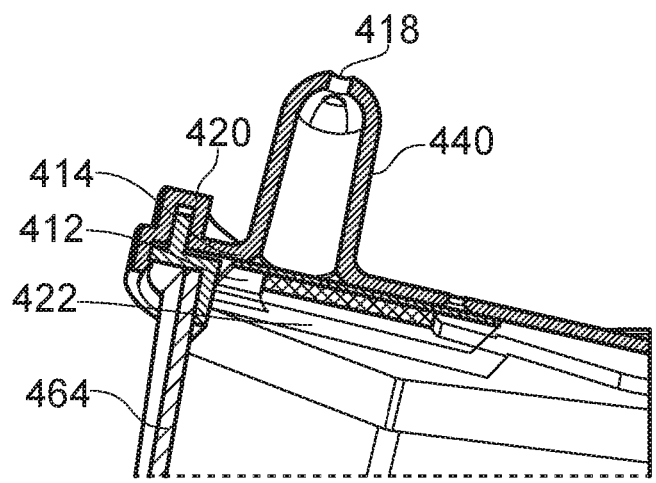
Figure 32:
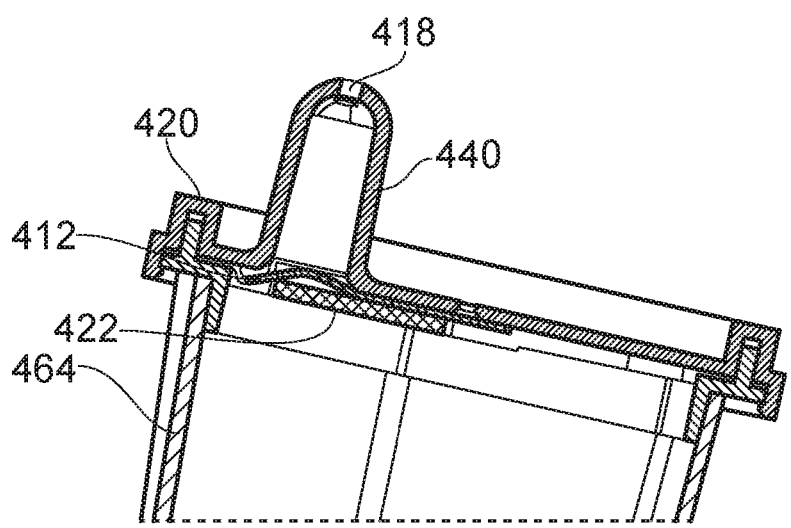

FIG. 23 is a perspective view of the container 405 comprising a valve 410 according to another example of the present disclosure, in a first configuration, being a demand configuration, with the valve 410 closed in FIG. 23. Here the container 405 comprises a body 464 with a hexagonal body. The non-circular body can assist in gripping the container, particularly for relatively rotating the container body 464 with other components of the container 405, such as the lid 420. A cross-section of the container 405 in the configuration of FIG. 23 is shown in FIG. 31. The cross-section of FIG. 31 is generally similar to that of FIG. 8, with the valve member 412 sealing against the valve seat to prevent or at least impeded outflow of liquid from the container 405. The valve member 412 functions similarly to that 12 of FIG. 1, with FIG. 32 showing the cross-section of the portion of the container 405 with the valve 410 in the open position for the demand configuration of FIG. 23. The cross-section of FIG. 32 corresponds generally to that shown in FIG. 9, with flow of liquid from the body 464 to the outlet 418 enabled by the levering of a portion of the valve member 412 away (downwards as shown) from the valve seat 414 due to deformation under suction of another portion of the valve member 412 into the spout 440 (upwards as shown) levering the portion of the valve member 412 away from the valve seat 414. FIG. 25 shows the container 405 with the lid 420 rotated about a central longitudinal axis of the container 405 through 180 degrees. The retainer 422 and valve member 412 and engaging surface of the lid 420 (underside of lid as shown) are all generally flat and planar, allowing a relative sliding therebetween for reconfiguration. The retainer 422, and also the valve member 412, are connected to the body 464 here, such as by an interference fit, to prevent relative rotation between the body 464 and the retainer 422. Accordingly the relative rotation of the lid 422 has misaligned the spout 440 and outlet 418 with the valve member 412 as shown in FIG. 24. As shown in FIG. 24, the retainer 422 comprises a non-valve outlet opening 418a for use in the free-flow configuration. Accordingly, the container 405 can readily be reconfigured between free-flow and valved configurations by the relative rotation of the lid 422 and body 464 between the configurations of FIGS. 23 and 24. Here, the valved configuration can be used as a 'closed' or storage/transportation configuration for the free-flow configuration of FIG. 23 (e.g. the container 405 may be readily closed by rotation the lid 422 from the position of FIG. 24 to the position of FIG. 23). FIG. 30 shows a cross-section of the container 405 in the configuration of FIG. 24, with the spout 440 and outlet 418 relatively rotated to allow unimpeded, free flow of liquid from the container, without requiring suction to open the valve 410. The valve 410 is effectively bypassed by the misalignment of the outlet 418 with the valve 411.

Figure 26:
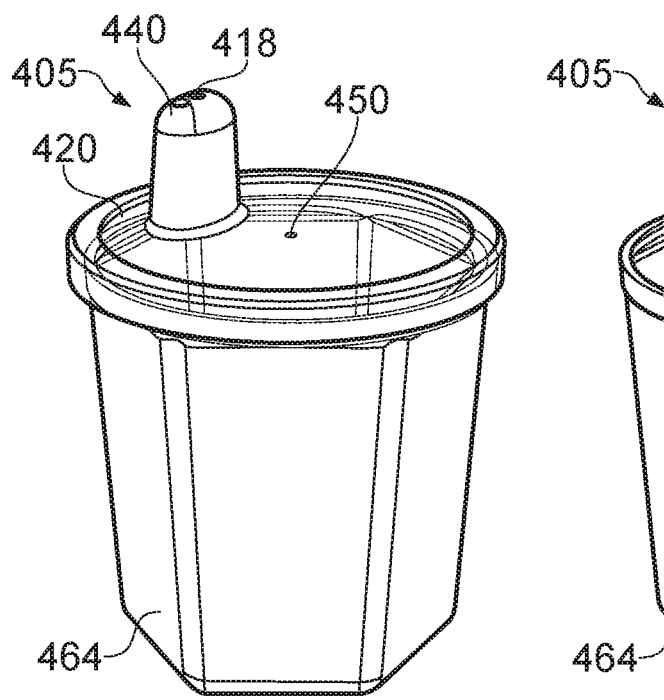
Figure 27:
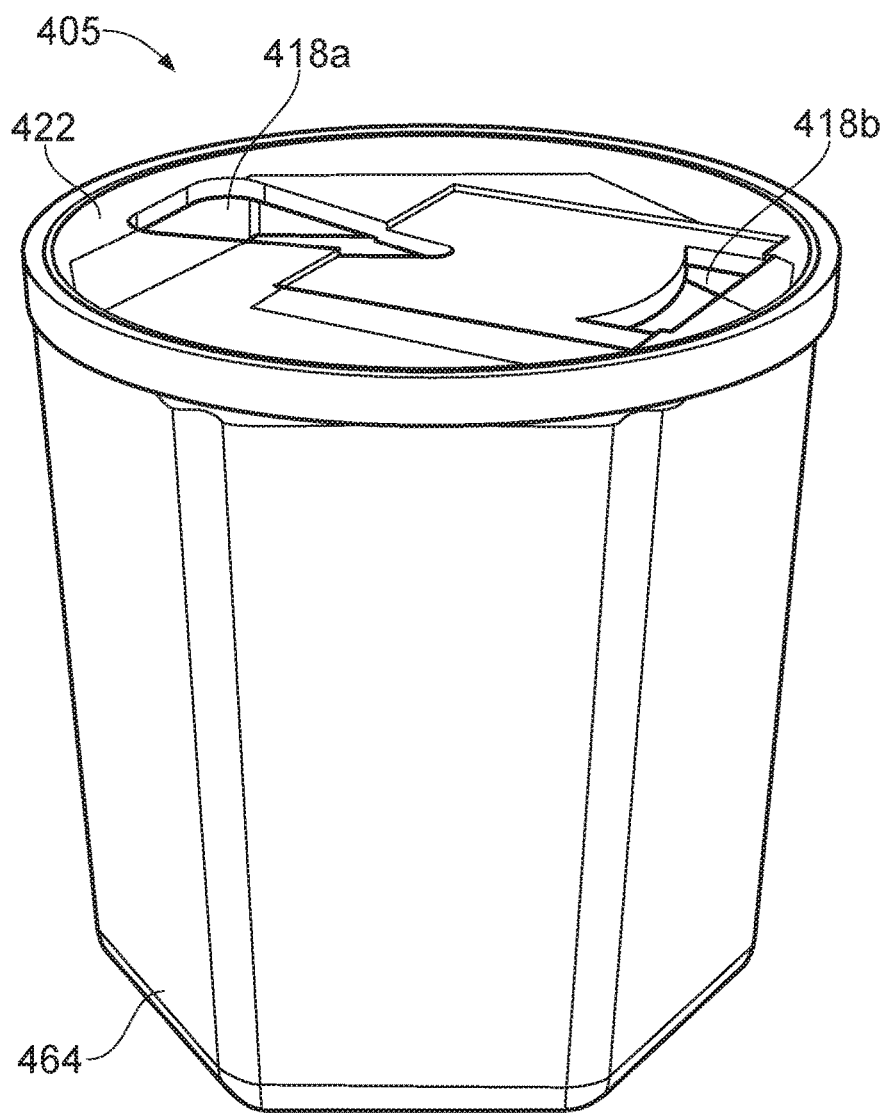

FIG. 25 shows an alternative free-flow configuration, whereby in addition to the rotation of the lid 422, the valve member 412 has been removed from the container. It will also be appreciated that another free-flow configuration can include the positioning of the spout 440 and outlet 418 over the valve opening or recess 418b of the retainer (e.g. the relative position of the lid 422 to the body 464 of FIG. 23, but with the valve member 412 removed as in FIG. 25). FIG. 26 shows a further free-flow configuration, whereby the retainer 422 and valve member 412 are removed from the container. FIG. 27 shows a further configuration of the container 405, with the lid 420 and valve member 412 removed. The retainer 422 here is held in the container body 464 by an interference fit here.

Figure 29:
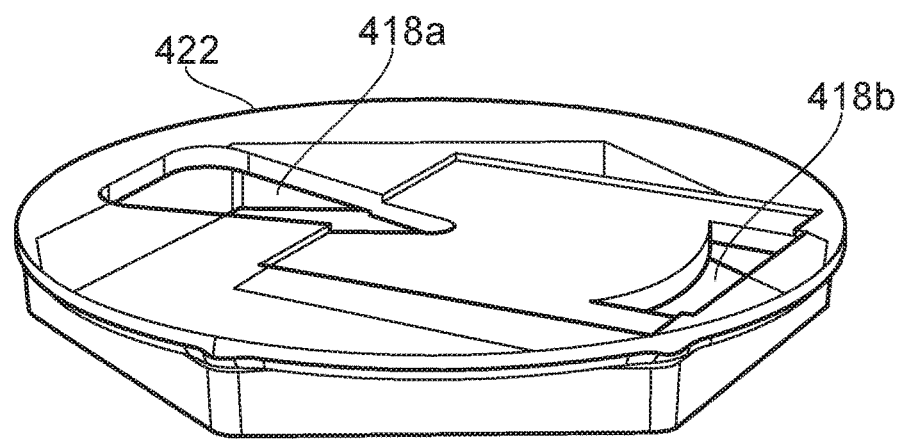
FIG. 29 is a perspective view of an example retainer 422 of the container 405 of FIG. 23.

FIG. 29 is a perspective view of the retainer 422 of the container 405 of FIG. 23. Accordingly, as shown here, the container 405 is a many stages training cup and can be used for each of: demand flow, free flow, training cup, and standard cup.

As shown here, the valve seat 414 is located towards the spout side of the container 405 (e.g. offset from the central longitudinal axis in the same direction as the spout 440).

Such offsetting allows the spout 440 and seat 412 to move away from the valve member 410 rotationally on the same plane (horizontal as shown in this particular example). The in-plane flatness of the valve member 412 allows the spout 440 and valve seat 414 to slide away from it. In this example, relative rotation in the same plane is advantageous as it retains the valve member 412 in place in the retainer 422. The particular retainer 422 here has a recessed portion for receiving and locating the valve member 412, holding the valve member 412 in place on the retainer 422 when the lid is moved relative thereto. Here, the absence of any aperture in the valve member 412 and the absence of any part (e.g. of the lid 420) passing through the valve member 412 assist or allow the relative movement therebetween, particularly from outside the container 405 (e.g. without opening or even temporarily removing the lid 420). The container 405 is reconfigurable between configurations whilst retaining any (liquid) contents in the container 405.

Figure 28:
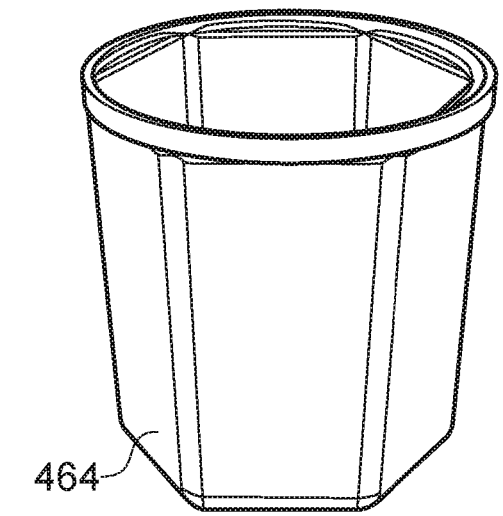
Figure 33:
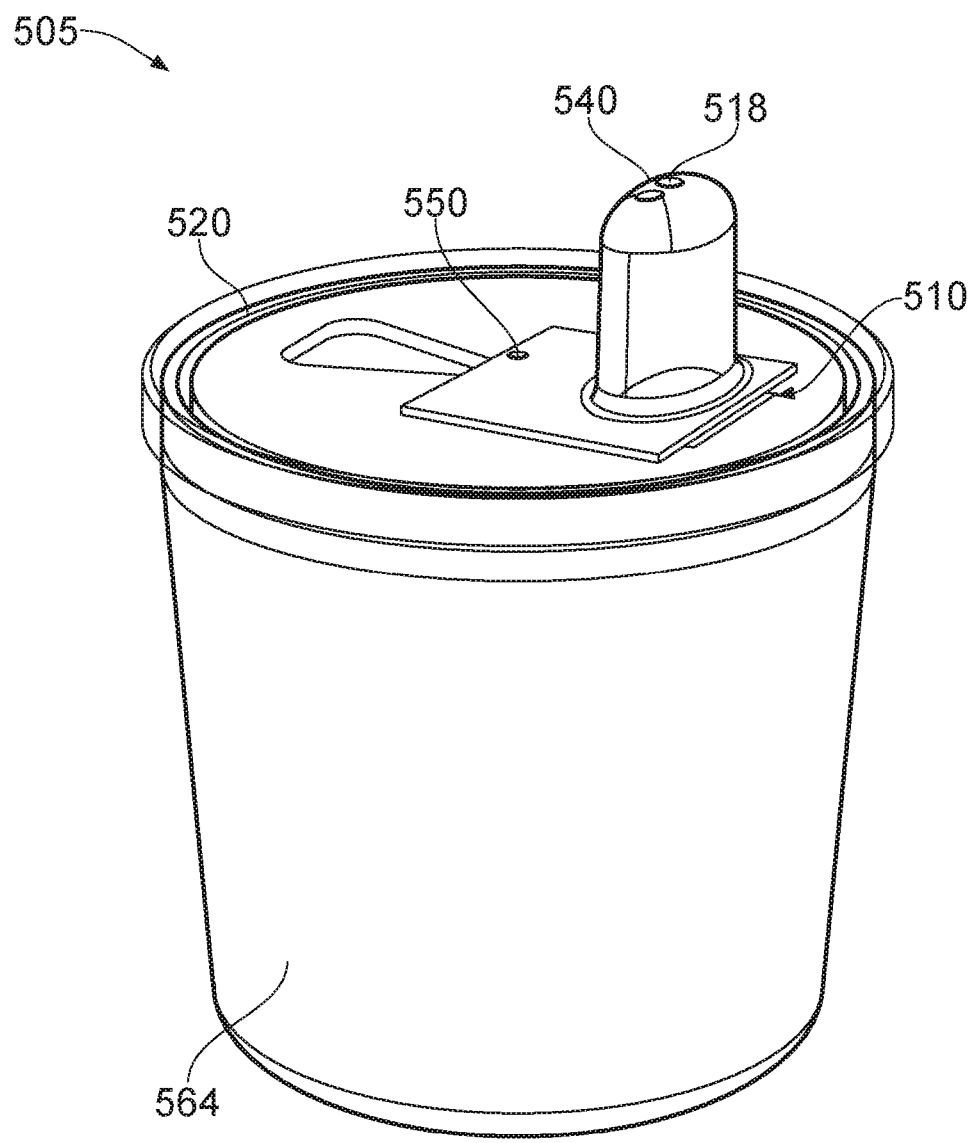
FIG. 33 is a perspective view of a container 505 comprising a valve 510 according to another example of the present disclosure.

FIG. 28 shows the container 405 reconfigured to a standard cup, consisting here of the container body 405. The container 405 is thus reconfigured with a full-bore outlet providing unimpeded, unbroken flow from the container body 464, with an outlet cross-section of the container body 464 corresponding to a cross-section of the container body 464 therebelow—when in an upright position as shown in FIG. 28. As can also be seen from FIGS. 30 to 32, the lid 420 is attachable to the container body 464 disparately from the retainer 422. In this example, the lid 420 and retainer 422 engage separate portions of the body 464 for attachment. As shown, the retainer 422 engages an inner side of the body 464 and the lid 420 engages an outer portion of the body 464. FIG. 33 is a perspective view of a container 505 comprising a valve 510 according to another example of the present disclosure. The container 505 and the valve 510 shown in FIG. 33 is generally similar to that shown in FIGS. 23 to 29, with similar features denoted by similar references numerals, incremented by 100. Accordingly, the valve 510 comprises a valve member 512 and a valve seat 514. For brevity, a description of not all detailed features is duplicated for this sixth example. Here, the container 505 comprises an internally-rotatable retainer 522. The container 505 here is less readily reconfigurable than the container 405 of FIG. 23, requiring access to the interior of the container 505 by at least temporary removal of the lid 520. The retainer 522 here cannot be used on the body 564 without the lid 520, such that this container 505 cannot be used as a training cup as in FIG. 27. Although not visible here, the retainer 522 has a rib to help gripping rotation and removal of the retainer.

It will be appreciated that any of the aforementioned apparatus may have other functions in addition to the mentioned functions, and that these functions may be performed by the same apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present invention may consist of any such individual feature or combination of features. It should be understood that the embodiments described herein are merely exemplary and that various modifications may be made thereto without departing from the scope or spirit of the invention. For example, it will be appreciated that although shown here as a rectangular or circular sheet member, the valve member 12 may comprise other forms, particularly other flat forms.

The invention claimed is:

1. A drinking vessel comprising a drinking vessel valve, the drinking vessel valve comprising:
   a valve member;
   a valve seat; and
   a retainer for retaining the valve member relative to the valve seat;
   the drinking vessel valve defining a flowpath between the valve member and the valve seat, the flowpath being selectively openable by movement of at least a portion of the valve member away from the valve seat in response to suction from an outlet of the drinking vessel, and the flowpath being selectively closable by movement of the at least a portion of the valve member towards the valve seat to seal in response to a reduction in suction from the outlet of the drinking vessel;
   wherein the valve member comprises a single flat sheet of flexible material, the movement of the at least a portion of the valve member away from the valve seat comprising a deformation of the single flat sheet of flexible material, with the valve member being resilient to bias itself towards the valve seat;
   wherein the valve member comprises a continuous unbroken major face for engagement with the valve seat, and the selectively openable flowpath is provided along the major face of the valve member, between the valve member and the valve seat, such that the flowpath does not pass through any aperture within the valve member;

wherein the valve seat is positioned between the valve member and the outlet of the drinking vessel; and wherein the drinking vessel valve provides a resistance to opening when the drinking vessel valve is closed, the resistance to opening being at least partially associated with a stiction between the valve member and the valve seat.

2. The drinking vessel of claim 1, wherein the single flat sheet of flexible material is of uniform thickness.

3. The drinking vessel of claim 1, wherein the retainer defines a compartment for housing the valve member, the retainer being arranged relative to the valve seat to define a height of the compartment greater than a corresponding thickness of the valve member so as to loosely retain the valve member in the vicinity of the valve seat but allow the valve member to move within the compartment.

4. The drinking vessel of claim 3, wherein the retainer is selectively movable relative to the valve seat to open the compartment to allow access to the valve member, for one or more of: assembly; disassembly; maintenance; cleaning; repair; replacement; and inspection.

5. The drinking vessel of claim 1, the drinking vessel valve comprising a vent, the vent at least assisting in balancing a pressure differential across the drinking vessel valve, the vent being configured to allow air to enter the drinking vessel via a discrete vent flowpath as fluid is extracted from the container through the flowpath and the outlet, wherein the vent is selectively openable and closable by the drinking vessel valve corresponding to the opening and closing of the outlet flowpath by the drinking vessel valve, the valve member being configured to seal both the outlet flowpath and the vent, when in the closed configuration; and the valve member being configured to open both the vent and the outlet flowpath when reconfigured from the closed to the open configuration.

6. The drinking vessel of claim 1, wherein the single flat sheet of flexible material is devoid of any apertures in any configuration of the valve member.

7. The drinking vessel of claim 1, wherein the drinking vessel comprises one or more of: an enclosed or enclosable container; a bottle; a cup; a sippy cup; a toddler drinking vessel; a baby drinking vessel; a baby bottle; a sports bottle; a reusable drinking vessel; and a disposable drinking vessel.

8. A drinking vessel comprising a drinking vessel valve, the drinking vessel valve comprising:
a valve member;
a valve seat; and
a retainer for retaining the valve member relative to the valve seat;
the drinking vessel valve defining a flowpath between the valve member and the valve seat, the flowpath being selectively openable by movement of at least a portion of the valve member away from the valve seat in response to suction from an outlet of the drinking vessel, and the flowpath being selectively closable by movement of the at least a portion of the valve member towards the valve seat to seal in response to a reduction in suction from the outlet of the drinking vessel;
wherein the valve member comprises a single flat sheet of flexible material, the movement of the at least a portion of the valve member away from the valve seat comprising a deformation of the single flat sheet of flexible material, with the valve member being resilient to bias itself towards the valve seat;
wherein the valve member comprises a continuous unbroken major face for engagement with the valve seat, and the selectively openable flowpath is provided along the major face of the valve member, between the valve member and the valve seat, such that the flowpath does not pass through any aperture within the valve member;
wherein the valve seat is positioned between the valve member and the outlet of the drinking vessel;
the drinking vessel valve further comprising a vent, the vent at least assisting in balancing a pressure differential across the drinking vessel valve, the vent being configured to allow air to enter the drinking vessel via a discrete vent flowpath as fluid is extracted from the container through the flowpath and the outlet, wherein the vent is selectively openable and closable by the drinking vessel valve corresponding to the opening and closing of the outlet flowpath by the drinking vessel valve, the valve member being configured to seal both the outlet flowpath and the vent, when in the closed configuration; and the valve member being configured to open both the vent and the outlet flowpath when reconfigured from the closed to the open configuration; and wherein the valve member is arranged such that a movement of the valve member towards a source of suction to open the drinking vessel valve, causes the valve member to slide to reveal a venthole of the vent.

9. A drinking vessel comprising a drinking vessel valve, the drinking vessel valve comprising:
a valve member;
a valve seat; and
a retainer for retaining the valve member relative to the valve seat;
the drinking vessel valve defining a flowpath between the valve member and the valve seat, the flowpath being selectively openable by movement of at least a portion of the valve member away from the valve seat in response to suction from an outlet of the drinking vessel, and the flowpath being selectively closable by movement of the at least a portion of the valve member towards the valve seat to seal in response to a reduction in suction from the outlet of the drinking vessel;
wherein the valve member comprises a single flat sheet of flexible material, the movement of the at least a portion of the valve member away from the valve seat comprising a deformation of the single flat sheet of flexible material, with the valve member being resilient to bias itself towards the valve seat;
wherein the valve member comprises a continuous unbroken major face for engagement with the valve seat, and the selectively openable flowpath is provided along the major face of the valve member, between the valve member and the valve seat, such that the flowpath does not pass through any aperture within the valve member;
wherein the valve seat is positioned between the valve member and the outlet of the drinking vessel; and
wherein the valve seat or the valve member is smooth, comprising a surface roughness below a maximum surface roughness.

10. The drinking vessel of claim 9, wherein the maximum surface roughness is defined by a Ra value selected from: 10 µm; 5 µm; 2 µm; 1 µm; 0.5 µm; 0.05 µm; and 0.02 µm.

11. The drinking vessel of claim 9, wherein the drinking vessel valve is reconfigured from a closed configuration to an open configuration by a movement of at least another portion of the valve member in a direction towards the outlet from the drinking vessel to open the flowpath, the movement of the at least another portion of the valve member to open the flowpath being in a direction transverse to the valve member.

12. The drinking vessel of claim 11, wherein the valve member comprises a diaphragm and the movement of the another portion of the valve member towards the outlet is towards the suction from the outlet, and the movement levers the portion of the valve member away from the valve seat.

13. The drinking vessel of claim 11, wherein the drinking vessel valve is biased towards the closed configuration at least partially by a stiffness of the valve member; and the drinking vessel valve is reconfigurable from the open configuration to the closed configuration by the stiffness of the valve member.

14. The drinking vessel of claim 11, wherein the drinking vessel valve comprises a valve recess into which the portion of the valve member is deflectable to allow opening of the flowpath, the valve recess forming part of the flowpath, and the valve recess comprises a relief portion defining one or more channels for the flowpath, the relief portion being incompatible with the flexibility of the valve member under usable suction, the relief portion comprising one or more angular changes smaller than a minimum bending radius of the valve member.

15. The drinking vessel of claim 9, wherein the valve member is planar when in the closed configuration, assembled in the drinking vessel valve.

16. The drinking vessel of claim 9, wherein the drinking vessel comprises one or more of: an enclosed or enclosable container; a bottle; a cup; a sippy cup; a toddler drinking vessel; a baby drinking vessel; a baby bottle; a sports bottle; a reusable drinking vessel; and a disposable drinking vessel.

17. The drinking vessel of claim 9, wherein the single flat sheet of flexible material is devoid of any apertures in any configuration of the valve member.

18. The drinking vessel of claim 9, wherein the drinking vessel valve provides a resistance to opening when the drinking vessel valve is closed, the resistance to opening being at least partially associated with a stiction between the valve member and the valve seat.

* * * * *